United States Patent
Brudniok

(10) Patent No.: US 11,185,995 B2
(45) Date of Patent: Nov. 30, 2021

(54) ROBOT GRIPPER HAVING A DRIVE DEVICE

(71) Applicant: KUKA Deutschland GmbH, Augsburg (DE)

(72) Inventor: Sven Brudniok, Langerringen (DE)

(73) Assignee: KUKA Deutschland GmbH, Augsburg (DE)

( * ) Notice: Subject to any disclaimer, the term of this patent is extended or adjusted under 35 U.S.C. 154(b) by 531 days.

(21) Appl. No.: 16/301,345

(22) PCT Filed: May 5, 2017

(86) PCT No.: PCT/EP2017/060799
§ 371 (c)(1),
(2) Date: Nov. 13, 2018

(87) PCT Pub. No.: WO2017/194413
PCT Pub. Date: Nov. 16, 2017

(65) Prior Publication Data
US 2021/0229296 A1   Jul. 29, 2021

(30) Foreign Application Priority Data
May 13, 2016   (DE) ..................... 10 2016 208 331.7

(51) Int. Cl.
*B25J 15/02*   (2006.01)
(52) U.S. Cl.
CPC ................. *B25J 15/0253* (2013.01)
(58) Field of Classification Search
CPC .................................................. B25J 15/0253
See application file for complete search history.

(56) References Cited

U.S. PATENT DOCUMENTS 4,623,183 A * 11/1986 Aomori .................. B25J 15/103
                                                          294/106
5,161,846 A * 11/1992 Yakou .................... B25J 9/1612
                                                          294/106
(Continued)

FOREIGN PATENT DOCUMENTS

CN          1069464 A       3/1993
CN        102069502 A       5/2011
(Continued)

OTHER PUBLICATIONS

European Patent Office; Search Report in related International Patent Application No. PCT/EP2017/060799 dated Aug. 1, 2017; 5 pages.

(Continued)

*Primary Examiner* — Stephen A Vu
(74) *Attorney, Agent, or Firm* — Dorton & Willis, LLP

(57) ABSTRACT

A robot gripper includes a first gripper finger and at least one second gripper finger, a gripper main body, a base element mounted for rotation about a first rotational axis relative to the gripper main body by a first rotary joint, and an intermediate element mounted for rotation relative to the base element by a second rotary joint. The gripper further includes a finger carrier carrying the first gripper finger and mounted for rotation relative to the intermediate element by a third rotary joint, namely about a third rotational axis, and a drive device that is separate from the first, second, and third rotary joints. The drive device is supported against the gripper main body and is configured to adjust the finger carrier relative to the second gripper finger with a drive force that is introduced into the finger carrier by the drive device.

17 Claims, 15 Drawing Sheets

(56) References Cited

U.S. PATENT DOCUMENTS

| | | | |
|---|---|---|---|
| 5,215,507 A | | 6/1993 | Bonig |
| 5,501,498 A | * | 3/1996 | Ulrich .................... B25J 13/084 |
| | | | 294/106 |
| 5,884,951 A | * | 3/1999 | Long ...................... B25J 15/026 |
| | | | 294/86.4 |
| 6,264,419 B1 | | 7/2001 | Schinzel |
| 2010/0165096 A1 | * | 7/2010 | Tassakos .................. B07C 5/34 |
| | | | 348/92 |
| 2011/0089709 A1 | * | 4/2011 | Neeper .................... B25J 15/10 |
| | | | 294/119.1 |
| 2015/0151438 A1 | | 6/2015 | Hecht et al. |

FOREIGN PATENT DOCUMENTS

| | | |
|---|---|---|
| EP | 0140569 A2 | 5/1985 |
| EP | 0170479 A1 | 2/1986 |
| EP | 0995555 A1 | 4/2000 |
| EP | 2660015 B1 | 3/2015 |
| WO | 2008083995 A1 | 7/2008 |

OTHER PUBLICATIONS

European Patent Office; Written Opinion in related International Patent Application No. PCT/EP2017/060799 dated Aug. 1, 2017; 7 pages.
Chinese Patent Office; Office Action in related Chinese Patent Application No. 201780029500X dated Jul. 5, 2021; 4 pages.
Chinese Patent Office; Search Report in related Chinese Patent Application No. 201780029500X dated Jun. 29, 2021; 3 pages.

* cited by examiner

ROBOT GRIPPER HAVING A DRIVE DEVICE

CROSS-REFERENCE TO RELATED APPLICATIONS

This application is a national phase application under 35 U.S.C. § 371 of International Patent Application No. PCT/EP2017/060799, filed May 5, 2017 (pending), which claims the benefit of priority to German Patent Application No. DE 10 2016 208 331.7, filed May 13, 2016, the disclosures of which are incorporated by reference herein in their entirety.

TECHNICAL FIELD

The invention relates to a robot gripper comprising a first gripper finger and at least one second gripper finger, a gripper main body, a base element that is mounted such that it can rotate about a first rotational axis in relation to the gripper main body by means of a first rotary joint, and an intermediate element that is mounted such that it can rotate in relation to the base element by means of a second rotary joint, namely about a second rotational axis which is aligned parallel to the first rotational axis and arranged at a constant first distance from the first rotational axis.

BACKGROUND

From WO 2008/083995 A1, a device for the quality control of a rotationally symmetrical body is known, wherein the device has a handling system with a grip for gripping the body and for transporting the body to a working position, and at least one electronic camera for the optical scanning of the body in the working position, wherein the grip of the handling system comprises grip fingers with rotationally symmetrically holding elements for holding the body, wherein the holding elements are mounted such that they can be rotated about their rotational axes. The holding elements of the grip finger of the grip are each non-rotatably connected to a cogwheel, wherein the cogwheels of all grip fingers of the grip, indirectly via at least one further cogwheel, are in mesh with a central cogwheel of the grip, and the grip has a drive mechanism which causes the central cogwheel to move rotationally.

From EP 2 660 015 B1, a gripper for manipulating particularly tube-shaped specimen cups is known, having a gripper base, at least two gripper fingers each comprising a retaining section for clutching a specimen cup and being arranged to rotate relative to the gripper base about a finger rotation axis, wherein the retaining sections of the finger grippers are arranged acentrically relative to the associated finger rotation axis, and having a first drive for twisting the gripper fingers, wherein the gripper fingers are coupled to each other such that they are driven by the drive at the same time and with the same rotation velocity and direction, wherein the gripper base is arranged on a main part and relative to said main body rotatably about a base rotational axis which is different from the finger rotational axes, that a second drive is provided for twisting the gripper base relative to the main body, and that a control unit is provided for controlling the drives such that a movement combination of twisting the gripper fingers relative to the gripper base and twisting the gripper base relative to the main body results for each of the retaining sections of the gripper fingers in each case in an essentially linear movement relative to the main body.

SUMMARY

The problem addressed by the invention is that of creating a robot gripper that has a simple and reliable mechanical structure.

According to the invention, this problem is solved by a robot gripper comprising a first gripper finger and at least one second gripper finger, a gripper main body, a base element that is mounted such that it can rotate about a first rotational axis in relation to the gripper main body by means of a first rotary joint, and an intermediate element that is mounted such that it can rotate in relation to the base element by means of a second rotary joint, namely about a second rotational axis which is aligned parallel to the first rotational axis and arranged at a constant first distance from the first rotational axis, and further comprising a finger carrier carrying the first gripper finger and mounted such that it can rotate in relation to the intermediate element by means of a third rotary joint, namely about a third rotational axis which is aligned parallel to both the first rotational axis and the second rotational axis and arranged at a constant second distance from the second rotational axis, as well as comprising a drive device which is separate from the first rotary joint, the second rotary joint, and the third rotary joint, which is supported against the gripper main body and which is designed to adjust the finger carrier relative to the second gripper finger with a drive force, said drive force being introduced into the finger carrier via the drive device.

Robotic arms with associated robot controls, particularly industrial robots, are work machines which can be equipped with tools for automatic handling and/or processing of objects and are programmable in a plurality of movement axes, for example, with regard to orientation, position, and work sequence. Industrial robots usually have a robotic arm with a plurality of links connected via joints and programmable robot controls (control devices) which automatically control or adjust the motion sequences of the robotic arm during operation in order to position and move a robot flange of the robotic arm in space. For that purpose, the links are moved via drive motors, particularly electric drive motors, which are controlled by the robot control, particularly with regard to the movement axes of the industrial robot which represent the movement degrees of freedom of the joints.

The robot, for example, can be an industrial robot which, in particular, can be a buckling arm robot with serially consecutive rotational axes, for example, six rotational axes. Alternatively, the robot can be a SCARA robot, i.e., a horizontal jointed-arm robot which, as a rule, has four degrees of freedom or axes, i.e., joints, wherein three joints can be rotary joints and one joint is a sliding joint. However, the robot can also be a so-called lightweight robot which, in particular, can have seven serially consecutive rotational axes.

Lightweight robots differ from conventional industrial robots in that they have a frame size favorable for the human-machine cooperation and a carrying capacity which is high relative to their own weight. In addition, lightweight robots can be operated in a power- and/or torque-controlled manner instead of only in a position-controlled manner which, for example, makes a human-machine cooperation safer. Furthermore, with such a safe human-machine cooperation it can be achieved that, for example, inadvertent collisions of the robotic arm with persons, such as workers and fitters, are either prevented or at least reduced to such an extent that no harm comes to the persons or fitters.

Such a robotic arm or such a lightweight robot preferably comprises more than six degrees of freedom, and so in this respect, an overdetermined system is created, with which the same point in space in the same orientation can be reached with a plurality, particularly even with an infinite number, of different poses of the robotic arm. The lightweight robot can react in suitable ways to external force effects. For the force measurement, torque sensors arranged at the joints can be used which can detect or measure torques and forces in a plurality of directions in space. Alternatively or additionally, the external forces can also be gauged without sensors, for example, by means of measured motor currents of the drives at the joints of the lightweight robot. For example, an indirect force control by modeling the lightweight robot as mechanical resistance (impedance), or a direct force control can be used as control concepts.

Similarly, a SCARA robot can also have torque sensors which are arranged on each of the joints and can detect or measure torques and forces in a plurality of directions in space. Alternatively or additionally, the external forces on a SCARA robot can also be gauged without sensors, for example, by means of measured motor currents of the drive motors at the joints of the SCARA robot.

Since the robot gripper comprises a drive device which is separate from the first rotary joint, the second rotary joint, and the third rotary joint, which is supported against the gripper main body and which is designed to adjust the finger carrier relative to the second gripper finger with a drive force, said drive force being introduced into the finger carrier via the drive device, a simple and reliable mechanical structure of the robot gripper can be achieved. This is achieved particularly in that the drive force is not conducted via the first rotary joint, the second rotary joint, and the third rotary joint, i.e., is not guided over any of the rotary joints, but instead is introduced directly from the gripper main body into the finger carrier and into the first gripper finger. The drive force is therefore guided exclusively via the drive device and not via the mounting system which comprises the base element and the intermediate element. A further aspect provides that the drive device, depending on the desired motion path, can be designed structurally differently for the movement of the first gripper finger despite a consistent structural design of the mounting system, i.e., of the first rotary joint, the second rotary joint, and the third rotary joint. A drive device of a first determined movement type can be replaced in a simple manner, for example, by a different drive device of a second movement type without having to replace the mounting systems, i.e. the rotary joints or the base element or the intermediate element. A first movement type, for example, can be a straight movement which the first gripper finger executes by being moved by the shortest path directly toward the second, particularly stationary, gripper finger. A second, different movement type, for example, can be a movement of the first gripper finger on a slanted or arc-shaped path.

This is achieved by the type of mounting system of the moving parts, particularly the base element, the intermediate element, and the finger carrier. The mounting system points which, for example, can be formed by lower bearings and upper bearings, can have a distinct distance from one another. By means of this type of mounting system, the mounting system force can be decoupled from the gripping force which is applied by the drive, i.e. by the separate drive device. A decoupling also takes place in case of a one-sided bearing which can absorb torques in both directions. The mounting system force absorbs the torque which, due to the length of the gripper fingers (gripper jaws), bears against the end of the gripper fingers which is near the gripper main body. The torque is design-dependently absorbed especially via a pair of forces, the force directions of which acts parallel to the jaw clamp force, but not perpendicularly, as is the case, e.g., in known standard linear guides.

In contrast to other grippers, the inventive robot gripper has a drive device separate from the mounting system. While the three rotary joints of the mounting system are usually driven directly and individually, or the three rotary joints of the mounting system are coupled to one another via fixed transmissions and are thus driven by a common drive, the three rotary joints of the mounting system for the inventive robot gripper are carried along passively and, in this configuration, only function as the mounting system of the moving gripper fingers. The first movable gripper finger is moved directly by means of the inventive drive device by immediate adjustment of the first gripper finger by the drive device, thus directly predetermining the path, along which the gripper finger is supposed to move. If the gripper finger is supposed to move along a linear path, the first gripper finger can be driven by a drive device which, for example, has a threaded spindle.

The robot gripper comprises at least two jaws, i.e., gripper fingers, which, in one embodiment, can move linearly to one another. The first jaw is arranged rigidly to the base of the gripper, with which the gripper is mounted to the flange of a robot, and the other jaw is able to move. This configuration allows for an exact grip, even if the movement of the one moving jaw is imprecise.

The object to be gripped is actively pressed by the moving jaw against the jaw which is static relative to the base of the gripper. Since the position of the stationary jaw is precisely known, the position of the gripped object is also precisely known.

In this design of the gripper, the one movable jaw can move in a straight line relative to the rigid jaw.

Such a linear movement is mounted via three rotations which are interlaced with one another. The diameters and the position of the three serially installed mounting systems can be adjusted to one another such that a movement of the moving jaw is possible on the provided path.

In order to facilitate the absorption of torques, which are caused by the gripper jaw length and the gripping force, by the mounting system, either mounting systems are installed that can absorb torques, such as four-point bearings, or two mounting system units are installed that have a distance to one another.

Mounting system units with a distance to one another can be formed, for example, by a pair of mounting system units, wherein one mounting system unit (in z-direction) is arranged in an upper plane (upper bearing) and the other mounting system unit (in z-direction) is arranged in a lower plane (lower bearing). The size of the inner diameters of the mounting systems in the lower plane is such that the mounting system of the intermediate element encloses the finger carrier and the mounting system of the base element encloses the intermediate element such that the finger carrier, which is fastened to a component extending through the mounting system of the lower plane to the spindle nut, can be moved on the path predetermined by the drive. The inner diameters of the mounting systems in the upper plane can have a smaller diameter because they do not have to enclose the serially consecutive bearings because in the upper mounting system plane, no component crosses the upper mounting system plane on the finger axis of the moving finger. The bearings with a greater diameter can also be designed such that they can absorb torques without a second upper bearing, for example, by means of cross-roller bearings or four-point bearings. Due to the diameter of the bearings, this mounting system can absorb high torques. In addition, a twisting of the bearing upper side toward the bearing underside is structurally prevented.

The clamping force at the jaws is generated solely by the drive device which acts directly on the moving jaw in the direction of the clamping force.

Accordingly, the at least one second gripper finger can be arranged to be stationary relative to the gripper main body. In this context, stationary can mean, among others, that the at least one second gripper finger is secured, for example, with screws. As a result, the at least one second gripper finger can be offset but no active drive device is present. Of course, the at least one second gripper finger can also be secured in a different manner or be integral with the main body.

In particular, the at least one second gripper finger can be rigidly fastened directly to the gripper main body.

In a specific embodiment, the drive device can comprise a motor and a drive spindle, which is mounted rotatably on the gripper main body about a spindle axis and rotatingly driven by the motor, and on which an output spindle nut is mounted which is linearly adjustable along the spindle axis, wherein the output spindle nut is coupled with the finger carrier for moving the finger carrier by driving the motor.

In a variation, the finger carrier can be rigidly connected to the output spindle nut.

In a different variation, the robot gripper can have a linear guide which is designed to guidedly mount the finger carrier relative to the gripper main body by means of a bivalent first mounting system for the absorption of forces such that the finger carrier is adjustable only in the direction of the spindle axis, wherein the finger carrier, for force transmission, is coupled to the output spindle nut by means of a univalent second mounting system.

The drive assumes the task of transferring a force in movement direction to the moving finger. In this design variation, forces are transferred by the drive in one movement direction, i.e., in x-direction. For example, in case of a drive with a drive spindle, the movement direction and thus the x-direction is the direction, in which an output spindle nut, which is coupled with the finger carrier, moves along the drive spindle linearly with regard to the spindle axis. The y-direction is thus a direction orthogonal to the x-direction and lies in a plane, from which the moving finger protrudes perpendicularly with its longitudinal extension. The longitudinal extension of the moving finger thus corresponds to the z-direction. The torques about the x-axis and the y-axis are absorbed by the mounting system of the finger. In the gripper, the forces must subsequently also be absorbed in y-direction and in z-direction, and the torque must be absorbed in z-direction. This can be achieved in different ways. For example, forces and/or the torque can be absorbed by the drive device. For that purpose, the moving jaw can be driven via a spindle which is mounted in the base of the gripper. The spindle is mounted such that it has only one degree of freedom, namely the rotation about the longitudinal axis which is driven by a motor. Via this spindle, it is possible with the spindle shaft to absorb the forces in y-direction and in z-direction, and to absorb the torque in z-direction.

Via the spindle, it is also possible to absorb torques in y-direction which are also absorbed by the mounting system, resulting in an additional stiffening of the mounting system.

Alternatively, the forces and/or torques can be absorbed by an additional guide. The output spindle nut can be connected to the finger such that no rigid connection is formed but specific directional components remain free of forces and torques. This refers to the forces in y-direction or z-direction and torques about the y-axis, the x-axis, and z-axis. As a result, the drive device is no longer loaded with the subsequently released forces and torques. These forces and torques can be introduced via the mounting system of the mechanism and/or via additional guides for the finger carrier and/or via additional guides at the mechanism of the gripper and absorbed by them.

If possible, the structure is to be designed distinctly. In special cases, double fits can be used, for example, to increase the stiffness. These double fits can be structured such that both stops come into effect only when the gripping force has exceeded a specific threshold. With a gripper, this only takes place, when the gripping force occurs, which is the case during a standstill. During a standstill, a double fit is not necessarily a kinematic disadvantage.

In a concrete embodiment, the drive device is located directly at or next to the spindle shaft, for example, in the housing of the robot gripper. The drive torque is transferred with a component of the drive train, e.g., a toothed belt or teeth on the spindle shaft.

In a specific design variation, the robot gripper can thus have a univalent torque support which is designed, for the absorption of torques, to mount the finger carrier relative to the gripper main body only by a single rotational degree of freedom about a longitudinal extension of the first gripper finger, wherein the finger carrier is supported in the two other rotational degrees of freedom by means of the first rotary joint, the second rotary joint, and the third rotary joint. This support can also allow for a support in y-direction and would then be bivalent.

In all designs, the base element can have a rotationally symmetrical outer casing wall, on which the base element is rotatably mounted entirely within the outer contour of the gripper main body, the intermediate element of the robot gripper can have a rotationally symmetrical outer casing wall, on which the intermediate element is rotatably mounted entirely within the outer contour of the base element, and the finger carrier of the robot gripper can have a rotationally symmetrical outer casing wall, on which the finger carrier is rotatably mounted entirely within the outer contour of the intermediate element, wherein the first rotary joint comprises a first lower bearing, which surrounds the base element and is arranged at a design height close to the finger carrier, and a first upper bearing which is spaced apart from the first lower bearing, particularly surrounds the base element, and is arranged at a design height distant from the finger carrier, the second rotary joint comprises a second lower bearing, which surrounds the intermediate element and is arranged at a design height close to the finger carrier, and a second upper bearing which is spaced apart from the second lower bearing, particularly surrounds the intermediate element, and is arranged at a design height distant from the finger carrier, the third rotary joint comprises a third lower bearing, which surrounds the finger carrier and is arranged at a design height close to the finger carrier, and a third upper bearing which is spaced apart from the third lower bearing, particularly surrounds the finger carrier, and is arranged at a design height distant from the finger carrier.

When the mounting system of one or more axis bodies, i.e., the base element, the intermediate element and/or the finger carrier, is distributed on two planes parallel to one another, the breakdown torques on the jaws can lead to a twisting of the two mounting systems relative to one another. This can be prevented by rigidly connecting to one another segments from both planes which perform the same movements. The connecting intermediate segments, such as journals, must be designed with regard to their shape such that they connect the two segments as rigidly as possible relative to a torsion about the common rotational axis.

The double mounting system of the gripper finger on its longitudinal axis allows for the absorption of torques. The lever for absorbing the torques can be selected to be longer than in a mounting system of a gripping finger on a linear guide. In addition, bearings can be used which can absorb greater forces due to their dimensions than is the case for known linear guides. With standard linear grippers, the absorption of the torques is usually achieved by means of a linear guide which has an L-shape and the lever of which runs perpendicular to the longitudinal axis of the finger. This results in a force deflection of 90° in the finger which, in turn, has to be designed specifically for that purpose.

The intermediate element and the base element can be mounted one-sided by means of bearings which can absorb transverse torques. Since the diameter of these mounting systems is large and represents a measurement for the lever, with which these bearings can absorb the transverse torques, these mounting systems can absorb huge transverse torques. As a result, greater torques can be absorbed with this mounting system than with a comparable standard linear gripper with a linear guide.

Accordingly, the intermediate element can thus comprise a first annulus disk which is rotatably mounted on the base element by means of the second lower bearing, and it can have a second annulus disk which is rotatably mounted on the base element by means of the second upper bearing, and the first annulus disk is rigidly connected to the second annulus disk by means of a connecting strut.

The intermediate element, in particular the journal, ensures an alignment of the segments, i.e. each of the pairs of upper and lower base element and/or upper and lower intermediate element, of both mounting system planes along the first rotational axis, and an alignment of the segments of both mounting system planes along the second rotational axis of the two mounting system planes. In case of a torsion of the two first mounting systems and a torsion of the two second mounting systems, the intermediate segment is subject to a shear load because the rotational axes are always somewhat offset from the intermediate segment, with which the two mounting system planes are connected. In its form and with the position and orientation of the subsegment, at which the guides engage, the intermediate segment can be designed such that it is for both torsional movements as sturdy as possible with regard to the shear deformations.

Alternatively or additionally to such a design of the intermediate element, the base element can accordingly also comprise a third annulus disk which is rotatably mounted on the gripper main body by means of the first lower bearing, and it can have a fourth annulus disk which is rotatably mounted on the gripper main body by means of the first upper bearing, and the third annulus disk is rigidly connected to the fourth annulus disk by means of a connecting strut.

In all designs, the robot gripper can comprise a device for circumventing singularities, in which the first rotational axis aligns with the third rotational axis, said device having a constraining means which is designed to impede a movement of the base element about the first rotational axis, during which the second rotational axis is immobile relative to the first rotational axis, and so a drive force introduced by the drive device in the area of the singularity results in the rotational movement of the second rotational axis to be greater than that of the first rotational axis.

A mounting system on a plane with at least two parallel rotational axes has singularities. If the distances between the three serially consecutive rotational axes are the same, there is a position, where two rotational axes lie coaxially on top of one another, and in which any number of joint positions can occur. When travelling through the singular position with the jaw along a path, there are two joint positions for the joints to assume. As a result, the angular position of the joints is no longer unambiguous with a guiding drive of the moving jaw.

In order to be able to push the joint paths unambiguously from the outside via a drive with one degree of freedom, constraints must be introduced. As long as the moving jaw is not located in the singularity, the adjusting joint angles are unambiguous during the movement of the jaw on a path. However, when passing through the singularity, two different configurations can be approached which, after a further travel, are once again unambiguous.

When the distances between the first rotational axis and the second rotational axis, and between the second rotational axis and the third rotational axis are identical, any number of joint positions can be approached in the singularity. However, this is only possible if the base element is rotated by an external force which is not the case during normal operation. In order to ensure that the joint positions are unambiguous, when passing through the singularity, a movement of the one rotary joint relative to the other rotary joint must be impeded. These movements driven passively from the outside can be impeded via a mechanism in different ways.

When passing through the singularity, both straight lines run parallel between the first rotational axis and the second rotational axis as well as the second rotational axis and the third rotational axis, even if they are not the same size. When the finger is pushed by a drive, which engages at the jaw, the joints are passively moved via a torque which is a result of the drive force and a lever which stands perpendicular to the movement direction. Since the distances between the rotational axes in the viewed singularity stand perpendicular to the movement axis, the distances between the first rotational axis and the second rotational axis or between the second rotational axis and the third rotational axis correspond to the levers for the drive torque of the first and the second axis of the rotational axes.

When passing through the singularity and the two distances between the rotational axes are identical or similar, and the larger bearing which, e.g., due to its size, has a greater friction resistance than the small bearing, the joint path, on which the large bearing must travel a greater joint angle than the small bearing, is avoided in favor of the joint path, on which the small bearing must travel a greater joint angle than the large bearing.

When continuing the movement, two configurations can occur, wherein in the first configuration, the small bearing travels a greater joint angle than the large bearing, and in the other configuration, the large bearing must travel a greater joint angle than the small bearing. Since the large bearing has a greater friction resistance than the small bearing, the path will adjust, resulting in a greater rotational movement for the smaller bearing than for the large bearing.

The constraining means can thus comprise a friction body connected to the gripper main body and a counter friction body connected to the base element, wherein the friction body and the counter friction body are designed and arranged such that in case of an approach of the first rotational axis to the third rotational axis, the friction body and the counter friction body make frictional contact which impedes a further rotation of the base element.

When the jaw is located in the singularity, the one segment contacts a resistance body on the main body, which in this position increases the rotational friction of the large bearing and impedes its movement. For this reason, the situation will once again arise, in which the small bearing twists about a greater joint angle.

When the distances between both rotational axes are identical and the jaw is moved on a straight line, which runs through the center of the first mounting system, there is a point in the second segment that also moves on a straight line which stands perpendicular to the path of the moving jaw. Said point is the pivot point of the third mounting system mirrored at the center of the second mounting system.

When the joint mechanism is located in the singularity, and the respective distances between adjacent rotational axes are identical, it is possible that the first segment and the second segment move jointly without a change in position of the third rotational axis. After the singularity is crossed on a path, the path can be approached with two different joint configurations. For that purpose, the point on the second segment must jump to the other side of the straight line, on which it runs. This can be prevented by a guide of said point on the straight line. At the location of the point, the second segment is connected to a journal which, e.g. is held in its path left and right by stops in the base of the gripper. The guide can absorb forces in the direction of the movement of the gripper jaw or against the movement of the gripper jaw.

The constraining means can comprise a journal connected to the intermediate element and a fork body which comprises a recess and is connected to the gripper main body, wherein the fork body and the journal are designed and arranged such that in case of an approach of the third rotational axis to the first rotational axis, the journal engages in the recess of the fork body in order to prevent a joint twisting of intermediate element and base by an interlocking coupling of the gripper main body with the intermediate element.

Since the constraining means is only supposed to act, when the gripper mechanism is located in the central singularity, it can be formed by form-slack elements which can only transfer forces in the singular joint position. One possibility is that of attaching two opposite cables between the gripper main body and the journal such that the two cables are only stretched in the position of the journal, when the joint mechanism is located in the singularity and the journal is thus at a maximum distance from the first rotational axis, and forces can be transmitted to the journal which prevent a common rotation of the intermediate element and the base element.

In such designs with, for example, form-slack elements, such as cables, the second segment is only stabilized, when the singularity is passed, and the joint angles are thus unambiguous in all points of the movement path. Even with a force additionally applied from the outside, it is not possible to predetermine other joint angles because the guide is interlocking. When compared to a stabilization through frictional forces, this is advantageous because said frictional forces could be bridged by additional forces from the outside onto the gripper which subsequently could result in a jamming of the gripper.

The journal can be formed by the connecting strut which connects the first annulus disk with the second annulus disk.

In general, the drive device can be designed so as to be self-locking in all embodiments and variations.

If, for example, the power supply on the robot gripper is interrupted while an object is gripped, the object is supposed to remain securely in the gripper and must not drop to the floor. It is thus desirable that the moving gripper finger is not reversible. The mounting system of the finger, when it is moved from the outside, is not supposed to be self-retaining in any position because as a result, it would also not be possible to move the finger with the drive motor. Therefore, the drive train between the motor and the moving finger must be designed such that it is no longer reversible. This can be made possible by means of a spindle drive with the appropriate incline in the spindle thread and corresponding frictional behavior. It must further be ensured that the jamming can always be actively released by the motor.

Generally speaking, the inventive robot gripper can have one or more of the following features: In a fixed structural configuration, the first rotary joint, the second rotary joint, the third rotary joint, and the drive train are coupled to one another passively, i.e., in an unpowered manner. Insofar, the robot gripper has only one single degree of freedom. Therefore, the robot gripper can be opened or closed with the only one drive device. The robot gripper is opened by a moving away of the first (movable) gripper finger from the second (stationary) gripper finger. The robot gripper is closed by moving the first (movable) gripper finger toward the second (stationary) gripper finger. The first gripper finger is moved by the only drive motor of the robot gripper. Due to the inventive coupling of the first rotary joint, the second rotary joint, and the third rotary joint by the drive, a more robust and stiffer mechanism can be created than it would be possible, for example, with a linear guide. The first rotary joint, the second rotary joint, and the third rotary joint can be mounted very rigidly in a manner known as such to a person skilled in the art, for example, by means of roller bearings or possibly friction bearings. Overall, very high clamp forces on the robot gripper can thus be realized.

Both the first (movable) gripper finger and the second (stationary) gripper finger can preferably be formed by rigid rods. By designing the gripper finger or gripper fingers as rigid rods, elaborate joints on the gripper fingers can be omitted, thus creating correspondingly cost-effective and also robust gripper fingers which, in addition, are barely susceptible to disruptions. However, these rigid rods can have diverse cross-section shapes. Each of the gripper fingers can also be replaceably attached to the robot gripper by means of a coupling device which connects the respective gripper finger to the robot gripper or its gripper main body or finger carrier. For example, the rods can have a general cylindrical outer casing wall, and in a cross-section running perpendicular to their longitudinal extension, the rods, for example, can have a circular, square, rectangular, triangular, or other geometric shape. In particular, the cylindrical outer casing wall of said rods can be a straight cylinder. All the gripping fingers present on the robot gripper can have the same cross-sectional shape. Alternatively, at least one gripping finger can have a different cross-sectional shape than the at least one other gripping finger. However, the gripping fingers present on the robot gripper can also have individual cross-sectional shapes which differ from one another.

In a first basic variation of the robot gripper, the first gripper finger can be mounted such that it can be adjusted in relation to the gripper main body via the first rotary joint, the second rotary joint, and the third rotary joint. The second (stationary) gripper finger is merely rigidly attached to the gripper main body. In a different variation, two rigid gripper fingers can be present which are both attached to the gripper main body at a distance from one another. Such a robot gripper thus has overall three gripper fingers, wherein the first gripper finger is adjustable via the first rotary joint, the second rotary joint, and the third rotary joint relative to the two other gripper fingers rigidly attached to the gripper main body.

In general, the first, moveable gripper finger can be moved on a straight path toward the at least one second, stationary gripping finger by means of the drive device. However, other types of path can be created, on which the first gripper finger can move toward or away from the second, stationary gripper finger. Such different forms of paths can be created by selecting differently designed drive devices without having to make changes to the rotary joints of the robot gripper.

In all design variations, the gripper main body can comprise a connecting flange which is designed for attaching the robot gripper to a tool flange of a robotic arm. Even if the robot gripper can be positioned by other automated devices, it is preferably provided that the robot gripper is moved in space by a robotic arm, wherein the robotic arm can be moved automatically, i.e., particularly program-controlled, by a robot control.

The base element can have a rotationally symmetrical outer casing wall, on which the base element is rotatably mounted entirely within the outer contour of the gripper main body; the intermediate element of the robot gripper can have a rotationally symmetrical outer casing wall, on which the intermediate element is rotatably mounted entirely within the outer contour of the base element, and/or the finger carrier of the robot gripper can have a rotationally symmetrical outer casing wall, on which the finger carrier is rotatably mounted entirely within the outer contour of the intermediate element. This can particularly mean that only the respective mounting system lies inside. However, it is also possible that segments of the drive train extend over a plurality of links.

In a further specific design variation, the robot gripper can be deigned such that
- the first rotary joint comprises a first bearing, particularly a first roller bearing, which surrounds the base element, having an inner ring, an inner ring track for rolling elements, an outer ring and an outer ring track, wherein the inner ring is fastened to the rotationally symmetrical outer casing wall of the base element, or the inner ring track is formed on the rotationally symmetrical outer casing wall of the base element,
- the second rotary joint comprises a second bearing, particularly a second roller bearing, which surrounds the intermediate element, having an inner ring, an inner ring track for rolling elements, an outer ring and an outer ring track, wherein the inner ring is fastened to the rotationally symmetrical outer casing wall of the intermediate element, or the inner ring track is formed on the rotationally symmetrical outer casing wall of the intermediate element,
- the third rotary joint comprises a third bearing, particularly a third roller bearing, which surrounds the finger carrier, having an inner ring, an inner ring track for rolling elements, an outer ring and an outer ring track, wherein the inner ring is fastened to the rotationally symmetrical outer casing wall of the finger carrier, or the inner ring track is formed on the rotationally symmetrical outer casing wall of the finger carrier.

With such a bearing design, particularly a roller bearing design or friction bearing design, a particularly rigid arrangement of the first rotary joint, the second rotary joint, and the third rotary joint can be achieved. Accordingly, the second roller bearing, particularly in the lower bearing plane, is insofar completely surrounded by the first roller bearing, and the third roller bearing, particularly in the lower bearing plane, is completely surrounded by the second roller bearing and consequently also by the first roller bearing. In a modified design variation of the robot grip, one or more of the roller bearings, particularly all roller bearings, can be replaced by friction bearings.

In summary, by means of the inventive robot gripper, kinematics are created for a gripper with a mounting system which consist of three serially interlaced mounting systems and a drive device separate from said mounting systems. The drive device specifies a movement for the gripper finger and actively guides the moving gripper finger. By contrast, the mounting system allows the moving gripper finger to follow the path specified by the drive device. There is no drive via the individual mounting systems. The gripper has one single degree of freedom which is specified by the drive device.

The kinematics of the gripper allow for the guiding of a movable jaw. The second jaw can be rigidly connected to the base of the gripper. The gripped object is pressed against the rigid jaw by the moving jaw. This bracing allows for the absorption of torques. The movement driven by the drive device can be a linear movement. The three mounting systems can each be designed individually or double with parallel offset on the robot gripper. This can be expedient, when the mounting systems are supposed to structurally absorb the transverse torques. The mounting systems can be roller or friction bearings. If the mounting systems are designed double with parallel offset, it is possible, with a rigid connection of two segments offset to one another, to achieve that the respectively associated segments of the parallel mounting systems do not twist against one another. This allows for the mounting system of the jaws to be provided with a certain stiffness. The mounting system can absorb the two breakdown torques which act on the driven jaw. However, with this arrangement, the breakdown torques to be absorbed can become big. The torque about the longitudinal axis of the jaw can be absorbed by the kinematics which relays the drive movement to the finger. Alternatively, the torque about the longitudinal axis of the jaw can be absorbed by an additional guide of the moving finger. The forces in longitudinal direction of the jaw and the force which acts perpendicular to the movement direction and parallel to the gripper base plane on the moving finger can be absorbed by the kinematics which relays the drive movement to the finger. Alternatively, the forces in longitudinal direction of the jaw and the force which acts perpendicular to the movement direction and parallel to the gripper base plane on the moving finger can be absorbed by an additional guide of the moving finger.

In order to be able to handle singularities in the guided movement of at least two parallel rotational axes, mechanical constraints can be contained in the gripper. A mechanical constraint can be designed such that the movement of one mounting system, due to its size or its mounting system principle, is impeded in the singular position relative to the other mounting system. However, a mechanical constraint can also be designed such that the one mounting system is impeded in its movement in the angular position of the singularity by a dampener which, e.g., is generated by a local frictional contact. A mechanical constraint can further be designed such that a journal can be located on the second segment, said journal being located at the point, which itself moves on a straight line in case of a movement of the gripper jaw along a straight line. On its travel, said journal can be held by a guide along its movement path. This guide can extend over the entire path covered by the journal, or along a partial path, or only be present at a point which appears, when the kinematics is located in the singularity. As already mentioned, the journal can also be held in the singular position, for example, by means of cables. In such an embodiment of a constraining means with two cables, the respective one cable ends are fastened to the connecting strut or a journal. The respective other cable ends are fastened to the base element. When the connecting strut or the journal is moved on a path, e.g., a straight line, both cables are coiled by the journal on the basis of the contact point of the cable with said journal. However, they do not have to be under tension but can sag. Both cables are taut only in the singularity of the position of the connecting strut or the journal in order to hold the connecting strut or the journal in its position. The constraining means can correspondingly comprise a journal connected to the intermediate element, and two cables, each having a first cable end which are both fastened to the journal, and wherein the two respective other cable ends are fastened to the base element.

If the drive train between drive motor and moving finger is designed so as not to be reversible, it can be ensured that the gripping force is retained even in case of a power failure. The gripper can be fitted with adaptive and/or flexible jaws as gripper fingers.

The drive device can be designed for power- and/or torque-controlled controlling.

In case of a power- and/or torque-controlled controlling of the drive device of the robot gripper, the robot gripper can insofar be parameterized with regard to its stiffness. For that purpose, the drive device of the robot gripper is power- and/or torque-controlled by means of an impedance control system or an admittance control system. A gripper control or a robot control can be designed to create a certain compliance of the first gripper finger on the robot gripper, particularly by means of an impedance control system or an admittance control system, which is suitable for a safe human-robot cooperation. In such a compliance control system, a hand-geared operation can also mean that the robot gripper can be moved manually by a worker, i.e., in particular also the first gripper finger of the robot gripper can be manually adjusted.

Concrete embodiments of the invention are described in more detail in the following description with reference to the attached drawings. Concrete features of these exemplary embodiments, regardless in which context they are mentioned, possibly also considered in isolation or in further combinations, can represent general features of the invention.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
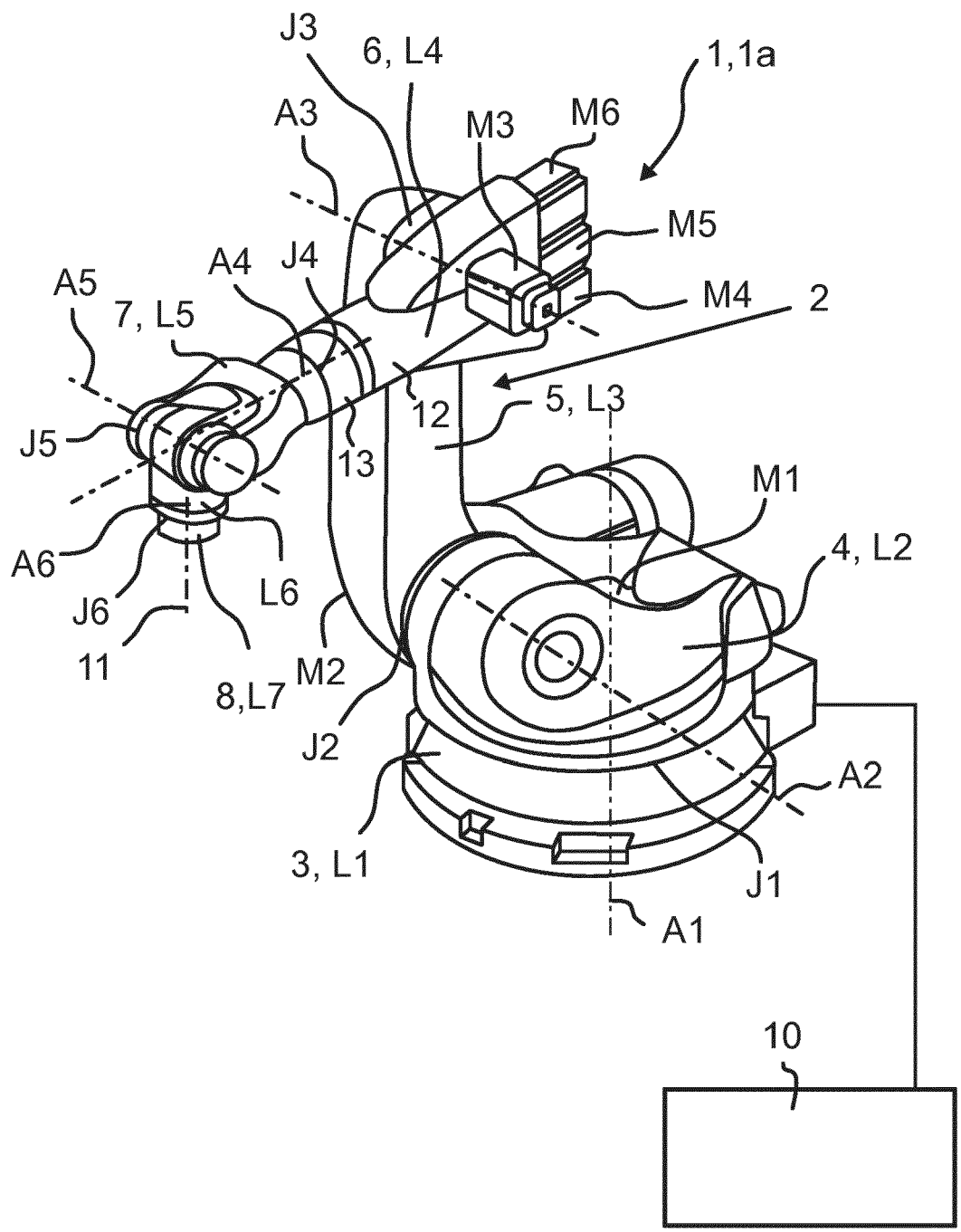
FIG. 1 shows a perspective view of an industrial robot in the form of a six-axis buckling arm robot.

FIG. 1 shows a robot 1 which comprises a robotic arm 2 and a robot control 10. In the case of the present embodiment, the robotic arm 2 comprises a plurality of links L1 to L7 which are arranged consecutively and rotatably connected to one another by joints J1 to J6.

The robot control 10 of the robot 1 is designed or geared to execute a robot program, with which the joints J1 to J6 of the robotic arm 2 can be automated in accordance with the robot program or automatically adjusted or rotated in a hand-geared operation. For that purpose, the robot control 10 is connected to controllable electric motors M1 to M6 which are designed to adjust the joints J1 to J6 of the robot 1.

In the case of the present embodiment of an industrial robot 1a, the links L1 to L7 are a frame 3 and a carousel 4 rotatably mounted about a vertical axis A1 relative to the frame 3. Further links of the robotic arm 2 are a link arm 5, a boom arm 6, and a preferably multi-axis robot hand 7 with a fastening device designed as a tool flange 8 for attaching an inventive robot gripper 11. The link arm 5 is pivotably mounted at the lower end, i.e., on the joint J2 of the link arm 5, which can also be called pivot bearing head, on the carousel 4 about a preferably horizontal rotational axis A2.

At the upper end of the link arm 5, the boom arm 6 is pivotably mounted on the first joint J3 of the link arm 5 about an also preferably horizontal axis A3. On its end, said boom arm 6 carries the robot hand 7 with its preferably three rotational axes A4, A5, A6. The joints J1 to J6 are each drivable by one of the electric motors M1 to M6 which are program-controlled via the robot control 10. For that purpose, a transmission can generally be provided between each of the links L1 to L7 and the respectively associated electric motors M1 to M6.

Figure 2:
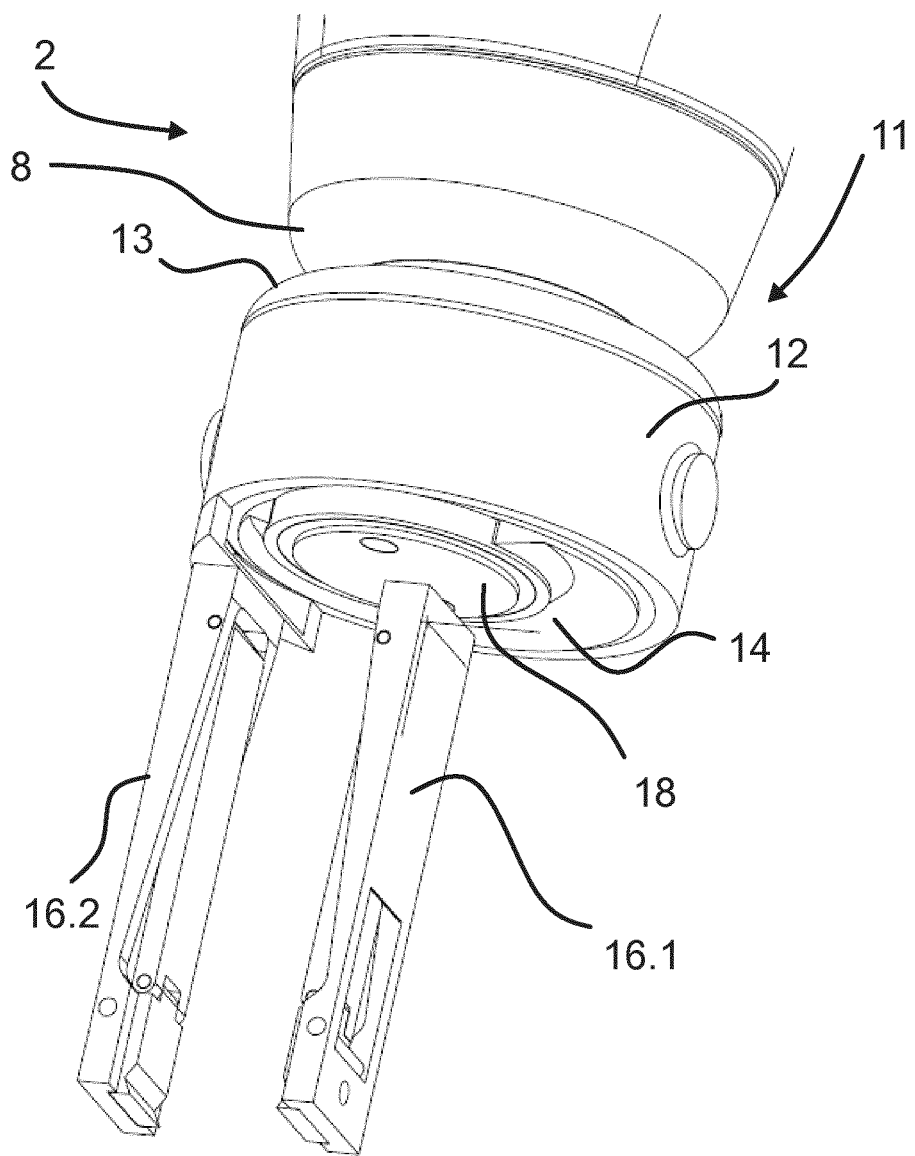
FIG. 2 shows a perspective view of a robot gripper having a first adjustable gripper finger and a second rigid gripper finger.

FIG. 2 shows an embodiment of an inventive robot gripper 11, comprising a first gripper finger 16.1 and a second gripper finger 16.2. The robot gripper 11 comprises a gripper main body 12, a base element 14, which is rotatably mounted relative to the gripper main body 12, and an intermediate element 18 which is rotatably mounted relative to the base element 14. The robot gripper 11 further comprises a finger carrier 17 (FIG. 3) which carries the first gripper finger 16.1 and is rotatably mounted relative to the intermediate element 18. The robot gripper 11 has a connecting flange 13 which is designed for fastening the robot gripper 11 to the tool flange 8 of the robotic arm 2.

Figure 3:
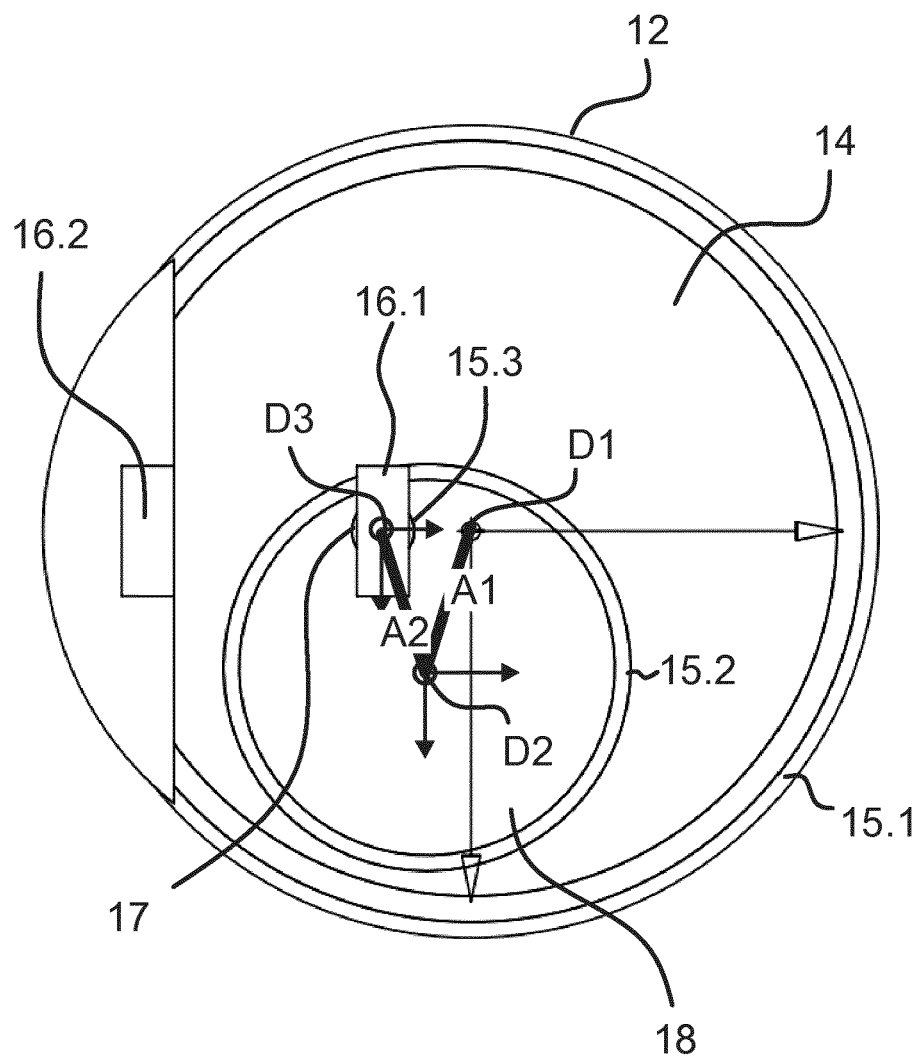
FIG. 3 shows a top view from below of the robot gripper according to FIG. 2.

FIG. 3 shows the robot gripper 11 in a top view from below, i.e., the gripper fingers 16.1 and 16.2 face forward from the drawing plane against the viewing direction. The robot gripper 11 comprises the first gripper finger 16.1 and the second gripper finger 16.2 as well as the gripper main body 12 and the base element 14. The base element 14 is mounted rotatably relative to the gripper main body 12 about a first rotational axis D1 by means of a first rotary joint 15.1. The intermediate element 18 is rotatably mounted relative to the base element 14 by means of a second rotary joint 15.2, namely about a second rotational axis D2 which is aligned parallel to the first rotational axis D1 and arranged at a constant first distance A1 from the first rotational axis D1. The finger carrier 17, which carries the first gripper finger 16.1 is rotatably mounted relative to the intermediate element 18 by means of a third rotary joint 15.3, namely about a third rotational axis D3 which is aligned parallel to both the first rotational axis D1 and the second rotational axis D2 and arranged at a constant second distance A2 from the second rotational axis D2.

In this embodiment, the links of the robot gripper 11, which are formed by the gripper main body 12, the base element 14, the intermediate element 18, and the finger carrier 17, form a kinematic chain of links which can be rotatably adjusted by means of the first rotary joint 15.1, the second rotary joint 15.2, and the third rotary joint 15.3. The three rotational axes D1, D2, and D3 of the first rotary joint 15.1, the second rotary joint 15.2, and the third rotary joint 15.3 are aligned parallel to one another. As a result, the first gripper finger 16.1, mounted on the finger carrier 17, can be moved in the plane of the second front side of the gripper main body 12 on a path toward or away from the stationary second gripper finger 16.2.

Figure 4:
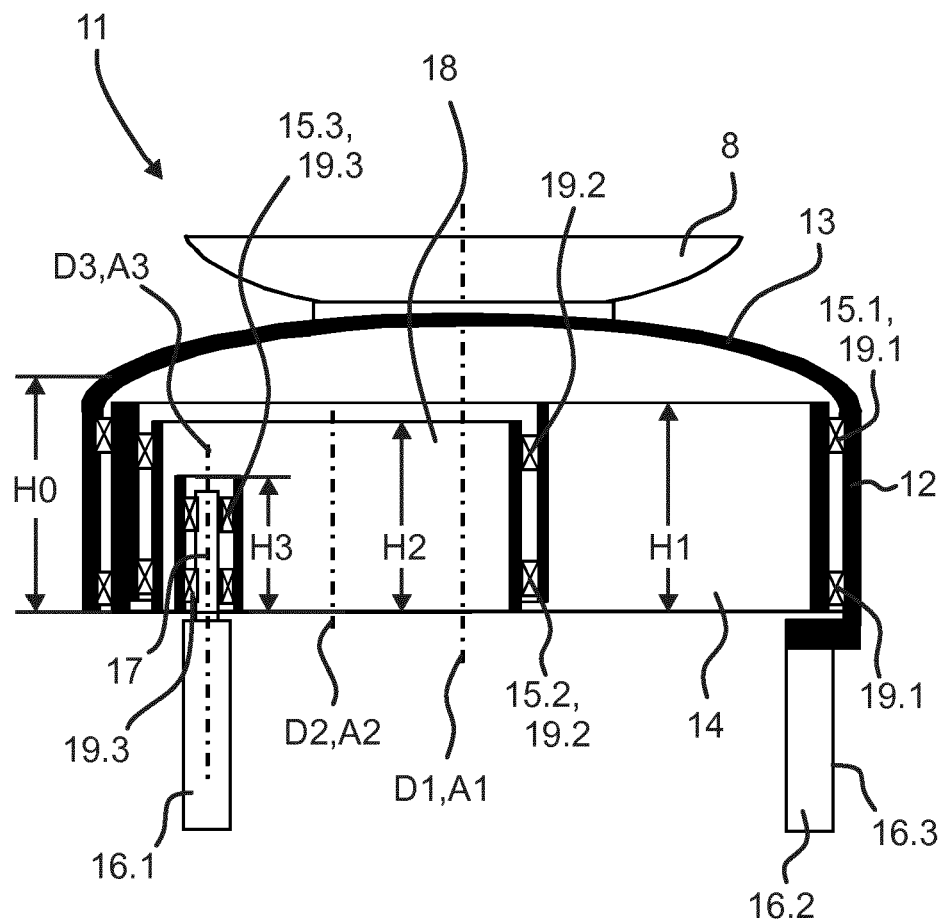
FIG. 4 shows a schematic cross-sectional view of the robot gripper according to FIG. 2.

The base element 14 comprises a rotationally symmetrical outer casing wall, on which the base element 14 is rotatably mounted entirely within the outer contour of the gripper main body 12 as is shown particularly in FIG. 4. The intermediate element 18 of the robot gripper 11 comprises a rotationally symmetrical outer casing wall, on which the intermediate element 18 is rotatably mounted entirely within the outer contour of the base element 14. The finger carrier 17 of the robot gripper 11 comprises a rotationally symmetrical outer casing wall, on which the finger carrier 17 is rotatably mounted entirely within the outer contour of the intermediate element 18.

In a specific design variation, as can also be seen particularly in FIG. 4, the base element 14 has a design height H1 which faces in the direction of the first rotational axis D1 and which is maximally as great as the design height H0 of the gripper main body 12 facing in the direction of the first rotational axis D1. The intermediate element 18 of the robot gripper 11 also has a design height H2 which faces in the direction of the second rotational axis D2 and which is maximally as great as the design height H1 of the base element 14 facing in the direction of the second rotational axis D2. The finger carrier 17 of the robot gripper 11 has a design height H3 which faces in the direction of the third rotational axis D3 and which is maximally as great as the design height H2 of the intermediate element 18 facing in the direction of the third rotational axis D3.

In this specific design variation, for example, the first rotary joint 15.1 comprises a first roller bearing 19.1, which surrounds the base element 14, having an inner ring, an inner ring track for rolling elements, an outer ring and an outer ring track, wherein the inner ring is fastened to the rotationally symmetrical outer casing wall of the base element 14. Alternatively, the inner ring track is formed on the rotationally symmetrical outer casing wall of the base element 14.

The second rotary joint 15.2 comprises a second roller bearing 19.2, which surrounds the intermediate element 18, having an inner ring, an inner ring track for rolling elements, an outer ring and an outer ring track, wherein the inner ring is fastened to the rotationally symmetrical outer casing wall of the intermediate element 18. Alternatively, the inner ring track is formed on the rotationally symmetrical outer casing wall of the intermediate element 18.

In addition, the third rotary joint 15.3 comprises a third roller bearing 19.3, which surrounds the finger carrier 17, having an inner ring, an inner ring track for rolling elements, an outer ring and an outer ring track, wherein the inner ring is fastened to the rotationally symmetrical outer casing wall of the finger carrier 17. Alternatively, the inner ring track is formed on the rotationally symmetrical outer casing wall of the finger carrier 17.

Figure 5:
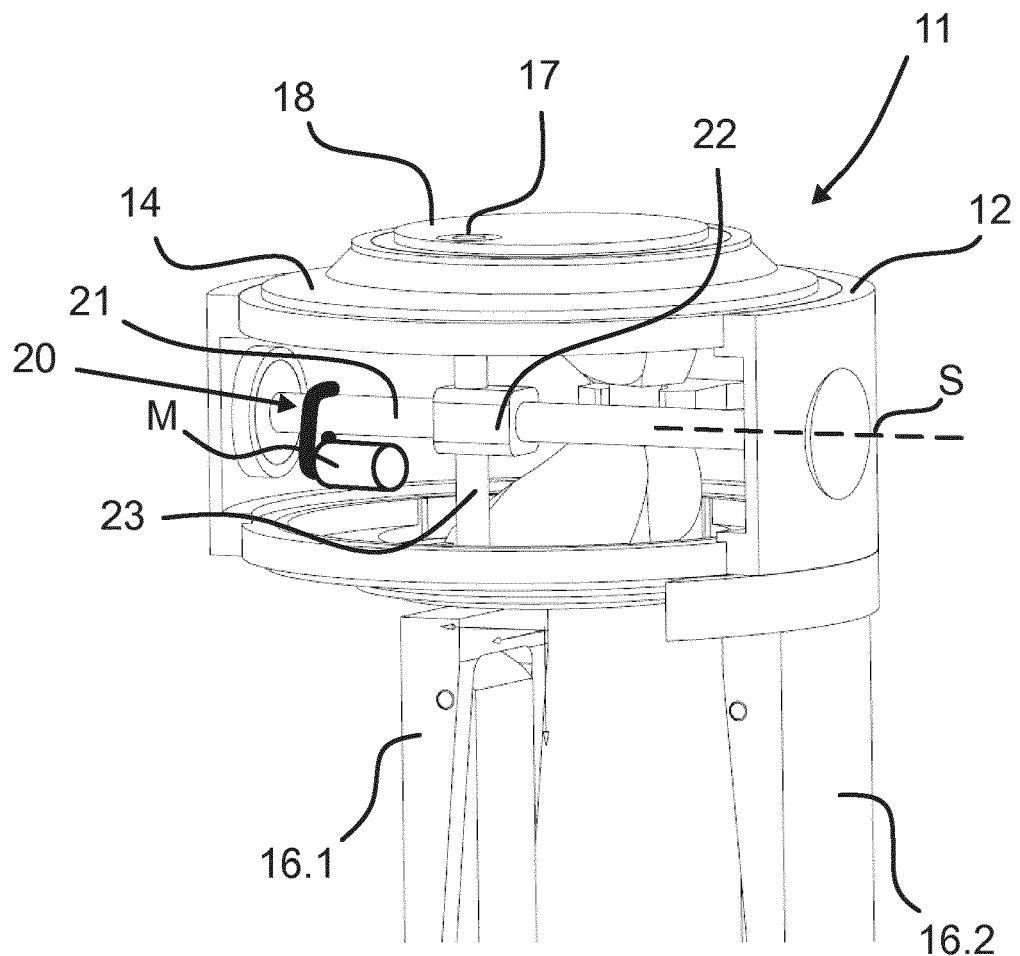
FIG. 5 shows a transparent view of the robot gripper according to FIG. 2 with the inventive drive device.
Figure 6:
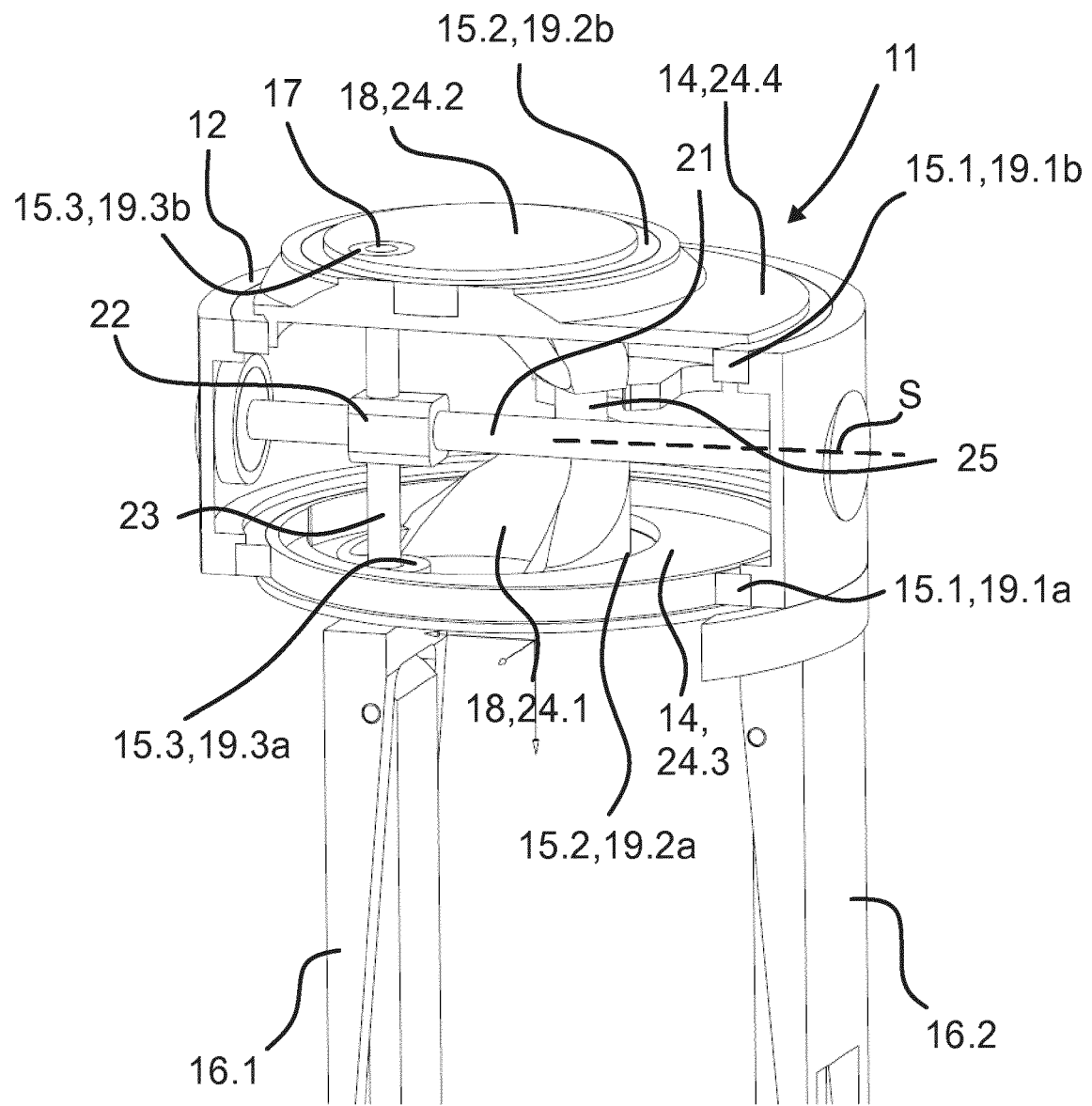
FIG. 6 shows a cross-sectional view of the robot gripper according to FIG. 2 with the inventive drive device.
Figure 7:
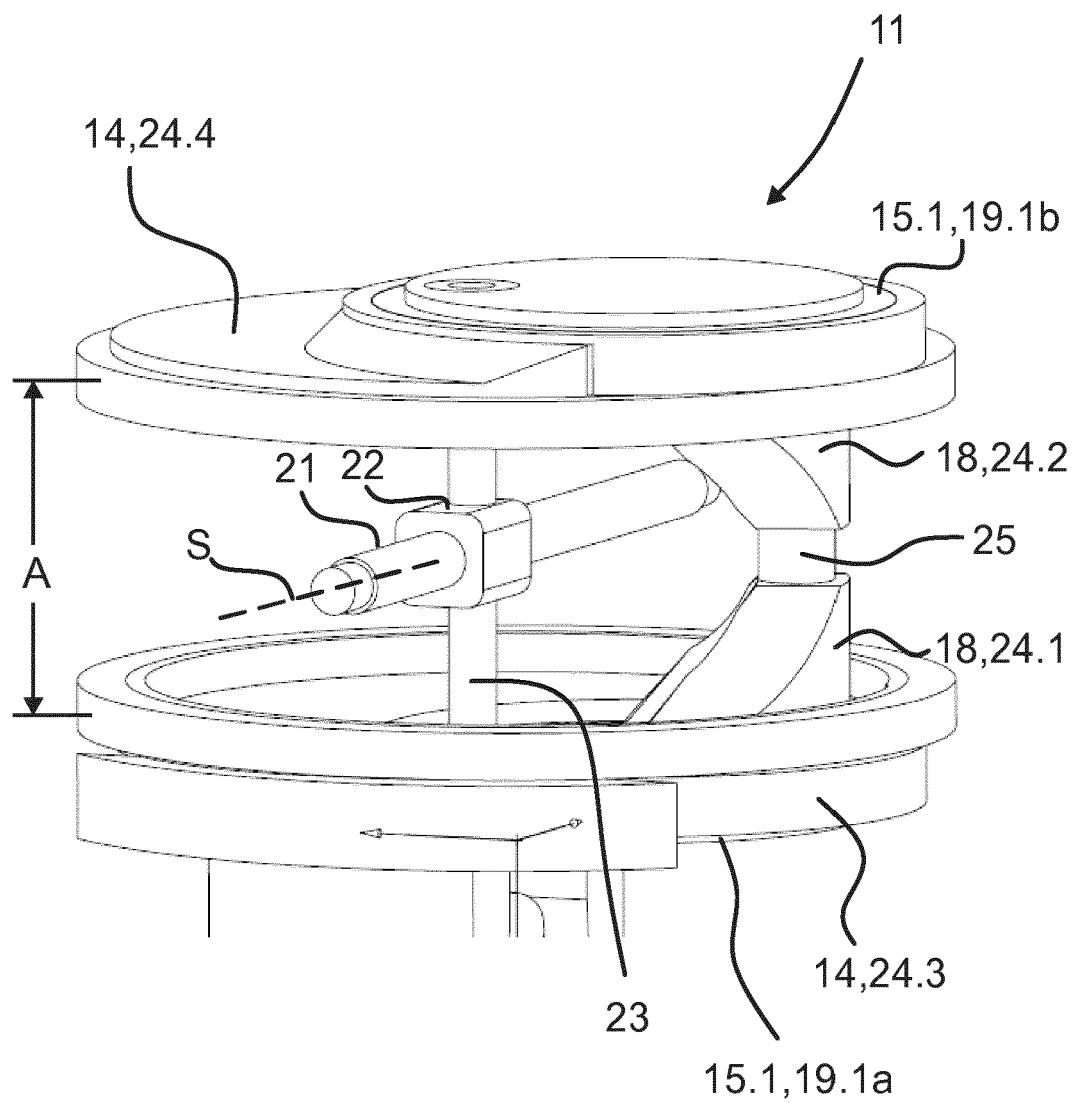
FIG. 7 shows a perspective partial view of the interior of the robot gripper according to FIG. 2 with the inventive drive device.

As can be seen from FIG. 5 to FIG. 7, the inventive robot gripper 11 comprises a drive device 20 which is separate from the first rotary joint 15.1, the second rotary joint 15.2, and the third rotary joint 15.3 and supported against the gripper main body 17, and which is designed to adjust the finger carrier 17 relative to the second gripper finger 16.2 with a drive force, said drive force being introduced into the finger carrier 17 via the drive device 20. The second gripper finger 16.2 is arranged stationary relative to the gripper main body 12.

In the depicted embodiment, the drive device 20 comprises a motor M and a drive spindle 21 which is mounted on the gripper main body 12 rotatably about a spindle axis S and rotatably driven by the motor M. On the drive spindle 21, an output spindle nut 22 is mounted and linearly adjustable along the spindle axis S. For moving the finger carrier 17 by driving the motor M, the output spindle nut 22 is coupled with the finger carrier 17. The finger carrier 17 is rigidly connected via a rod 23 to the output spindle nut 22.

Particularly FIG. 6 shows an embodiment with two-piece bearings. The first rotary joint 15.1 comprises a first lower bearing 19.1a, which surrounds the base element 14 and is arranged at a design height close to the finger carrier 17, and a first upper bearing 19.1b which is spaced apart from the first lower bearing 19.1a, surrounds the base element 14 and is arranged at a design height distant from the finger carrier 17. The second rotary joint 15.2 comprises a second lower bearing 19.2a, which surrounds the intermediate element 18 and is arranged at a design height close to the finger carrier 17, and a second upper bearing 19.2b which is spaced apart from the second lower bearing 19.2a, surrounds the intermediate element 18 and is arranged at a design height distant from the finger carrier 17. The third rotary joint 15.3 comprises a third lower bearing 19.3a, which surrounds the finger carrier 17 and is arranged at a design height close to the finger carrier 17, and a third upper bearing 19.3b which is spaced apart from the third lower bearing 19.3a, surrounds the finger carrier 17 and is arranged at a design height distant from the finger carrier 17.

The intermediate element 18 comprises a first annulus disk 24.1 which is rotatably mounted on the base element 14 by means of the second lower bearing 19.2a, and a second annulus disk 24.2 which is rotatably mounted on the base element 14 by means of the second upper bearing 19.2*b*, and the first annulus disk 24.1 is rigidly connected to the second annulus disk 24.2 by means of an intermediate element connecting strut 25, as shown in FIG. 6 and particularly also in FIG. 7.

In the case of the present embodiment, the base element 14 comprises a third annulus disk 24.3 which is rotatably mounted on the gripper main body 12 by means of the first lower bearing 19.1*a*, and a fourth annulus disk 24.4 which is rotatably mounted on the gripper main body 12 by means of the first upper bearing 19.1*b*, and the third annulus disk 24.3 is rigidly connected to the fourth annulus disk 24.4 directly by means of its own base element connecting strut (not depicted) or indirectly by means of the intermediate element connecting strut 25 of the intermediate element 18. The first lower bearing 19.1*a* is arranged at a distance A from the first upper bearing 19.1*b*.

Figure 8:
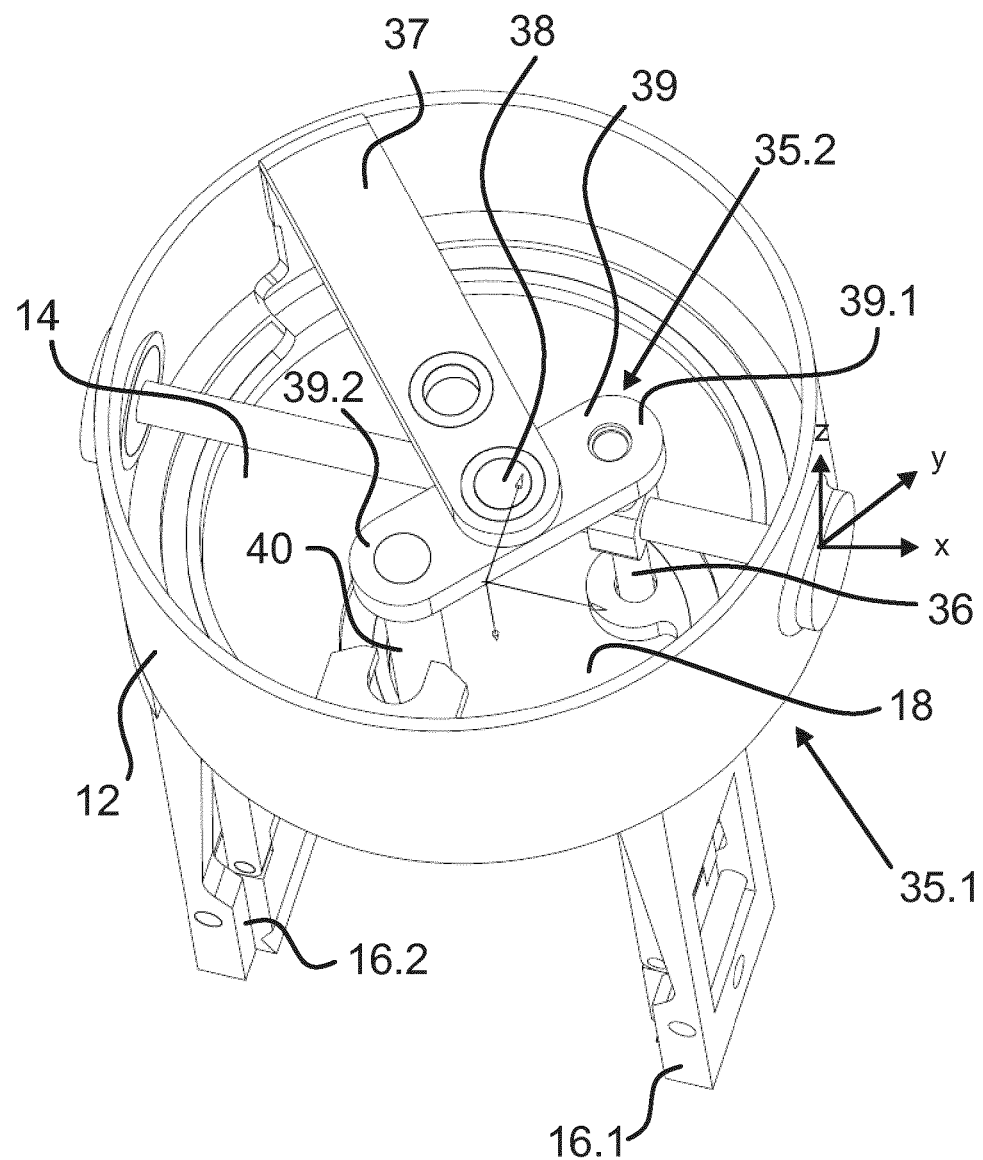
FIG. 8 shows a perspective partial view of the interior of the alternative robot gripper with an upper bearing having a rod-shaped lever.

FIG. 8 shows an alternative type of mounting system which is formed by a pair of mounting system units 35.1, 35.2, wherein one mounting system unit 35.2 (in z-direction) is arranged in an upper plane (upper bearing) and the other mounting system unit 35.1 (in z-direction) is arranged in a lower plane (lower bearing). The size of the inner diameters of the bearings of the mounting system unit 35.1 in the lower plane is such that the mounting system of the intermediate element 18 encloses the finger carrier 17, and the mounting system of the base element 14 encloses the intermediate element 18 such that the finger carrier 17, which is fastened to a component 36 that extends through the mounting system of the lower plane to the output spindle nut 22, can be moved on the path predetermined by the drive 20 (analogous to FIG. 5). The inner diameters of the bearings of the mounting system unit 35.2 in the upper plane can have a smaller diameter because they do not have to enclose the serially consecutive bearings because in the upper mounting system plane, no component crosses the upper mounting system plane on the finger axis of the moving finger. The respective pair (upper bearing and lower bearing) of mounting system units 35.1, 35.2 of the base element 14 and the intermediate element 18 each align with one another.

Fastened to the base element 14, the upper mounting system unit 35.2 can thus have an L-shaped bracket 37, on the free end of which a first pivot bearing 38 is arranged. On this first pivot bearing 38, a two-armed lever 39 is mounted which carries on its first lever arm 39.1 the output spindle nut 22, and with its second lever arm 39.2, it is connected via a rod 40 to the intermediate element 18 of the lower mounting system unit 35.1.

The torques can be absorbed about the x-axis and the y-axis with different measures. The mounting system of the base element 14, the intermediate element 18, and the finger carrier 17 can be designed such that these segments, due to a torque on the moving gripper finger 16.1 about the x- or y-axis, cannot be tilted toward one another, which can be achieved with mounting systems which absorb the torques about the x-axis and the y-axis. When installing two mounting system units, it must be ensured that the two planes of the base element 14 and the two planes of the intermediate element 18 cannot be twisted toward one another about their rotational axis. This can be achieved with the use of bearings which absorb the torques about the x-axis and the y-axis. This can furthermore be achieved in that the two planes of the base element 14 and the two planes of the intermediate element 18 are connected to one another such that their twisting is prevented. This can further be prevented in that the mechanism resulting from the joints contains journals, the movement of which is restricted by stops on the gripper main body 12.

Figure 9:
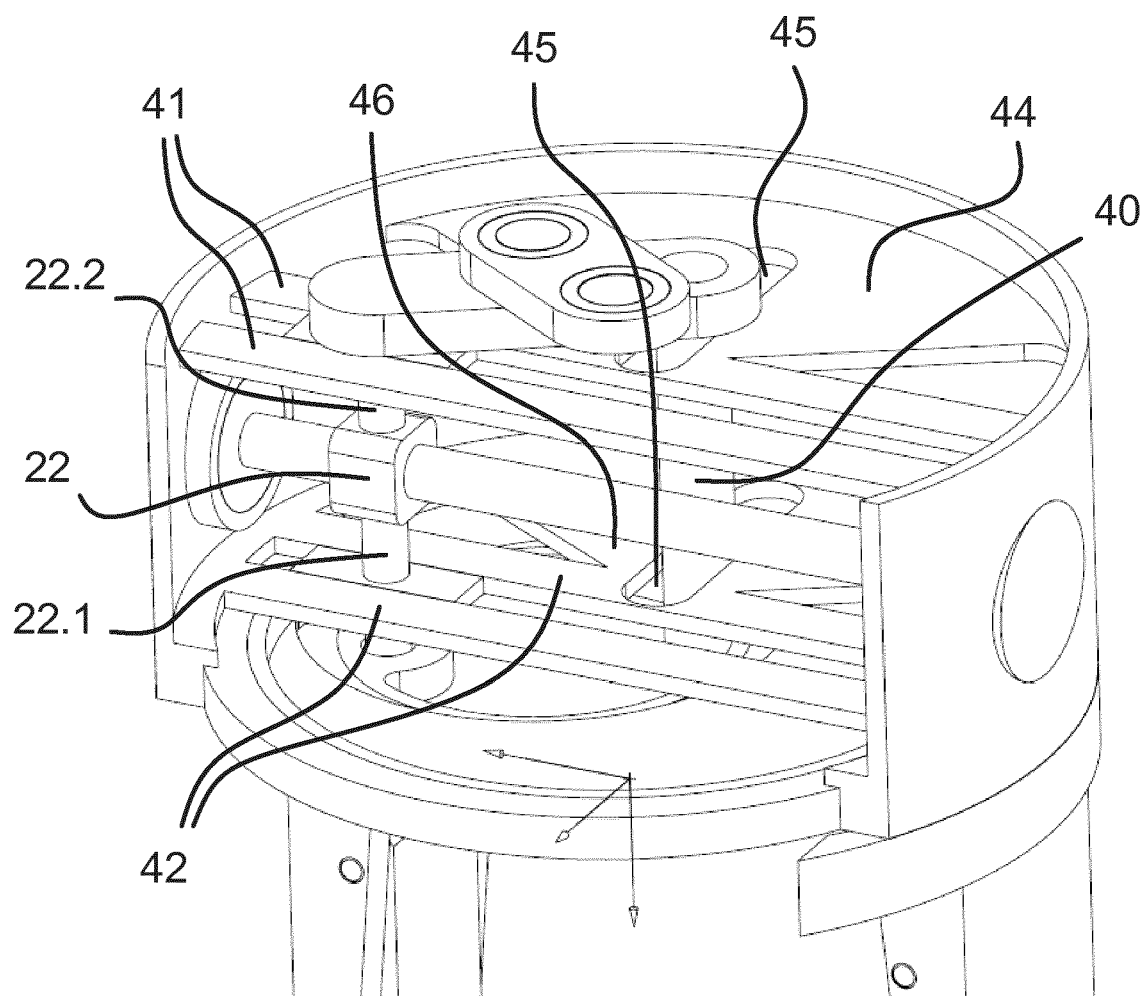
FIG. 9 shows a perspective cross-sectional view of the interior of a robot gripper modified with regard to FIG. 8, in which the moving gripping finger is guided on the respective upper bearing and lower bearing between two linear guides.

As shown in detail in FIG. 9, the output spindle nut 22 can comprise two opposite journals 22.1 and 22.2 which are each guided in a pair of upper linear guides 41, which are arranged spaced apart from one another in a parallel manner, and a pair of lower linear guides 42, which are arranged spaced apart from one another in a parallel manner. In the design variation according to FIG. 9, a further stiffening is achieved in that the rod 40 forms an intermediate body connecting strut which is held on the upper plane and simultaneously on the lower plane, i.e., on both sides, by a guide groove 45, particularly in the form of an elongated hole, which is formed in a ceiling wall 44 and a floor wall 46 which are both securely connected to the gripper main body 12.

Figure 10:
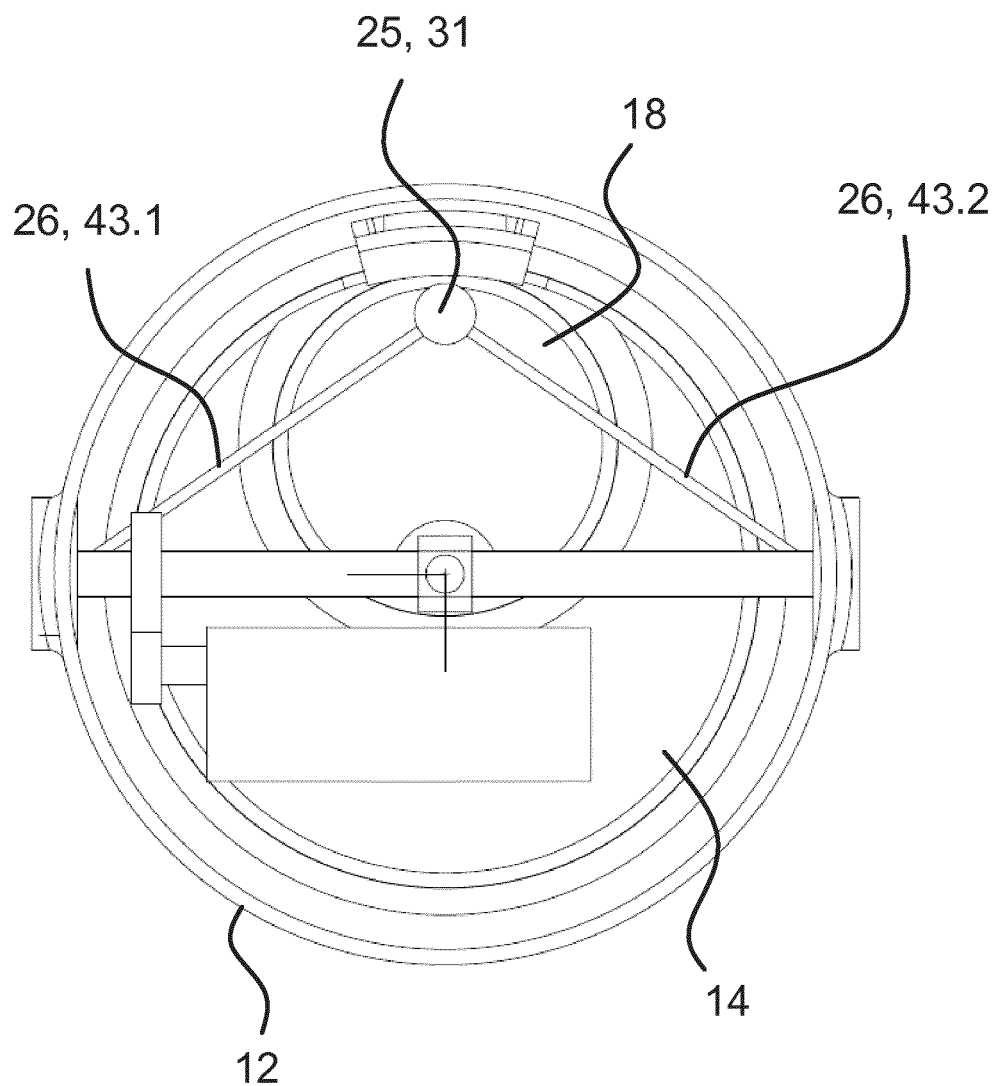
FIG. 10 shows a schematic view of an exemplary robot gripper in a singularity position with a constraining means comprising two cables.

FIG. 10 shows an exemplary embodiment of a constraining means in the form of two cables 43.1 and 43.2, each having a first cable end which is fastened to the intermediate element connecting strut 25 or the journal 31. The corresponding other cable end is fastened to the base element 14. In case of a movement of the intermediate element connecting strut 25 or the journal 31 on a path or a straight line, the cables, depending on the rotational direction, can bear against the intermediate element connecting strut 25 or the journal 31, i.e., "coil around" the circumference of the journal. Only in the singularity position of the intermediate element connecting strut 25 or the journal 31 shown in FIG. 10, both cables 43.1 and 43.2 are taut in order to hold the intermediate element connecting strut 25 or the journal 31 in its position.

FIG. 11 to FIG. 17 show different examples, in which the robot gripper 11 comprises a device for circumventing singularities, in which the first rotational axis D1 aligns with the third rotational axis D3, having a constraining means 26 which is designed to impede a movement of the first rotary joint 15.1 or the second rotary joint 15.2, and so a drive force introduced by the drive device 20 is transferred at least predominantly or entirely to the unimpeded rotary joint 15.1, 15.2.

Figure 11:
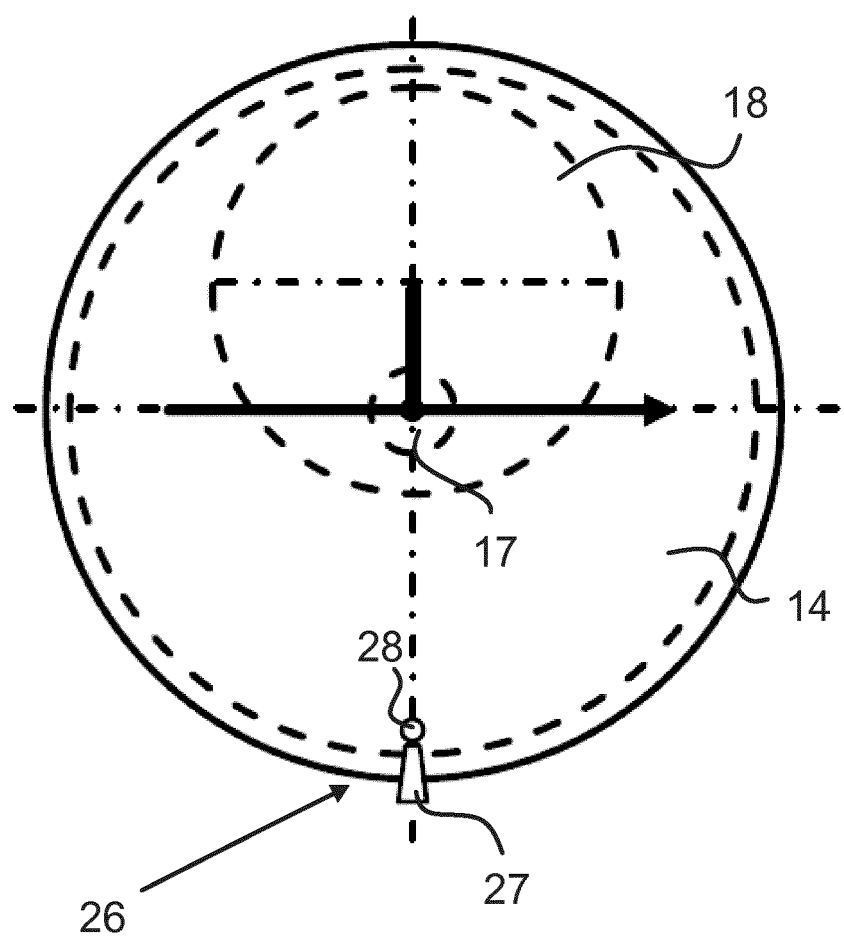
FIG. 11 shows a schematic view of a friction-type constraining means of the robot gripper.

As shown schematically in FIG. 11, the constraining means 26 can comprise a friction body 27 which is connected to the gripper main body 12, and a counter friction body 28 which is connected to the base element 14, wherein the friction body 27 and the counter friction body 28 are designed and arranged such that, in case of an approach of the first rotational axis D1 to the third rotational axis D3, the friction body 27 and the counter friction body 28, as is shown in FIG. 8, can make frictional contact which impedes a further rotation of the base element 14.

Figure 12:
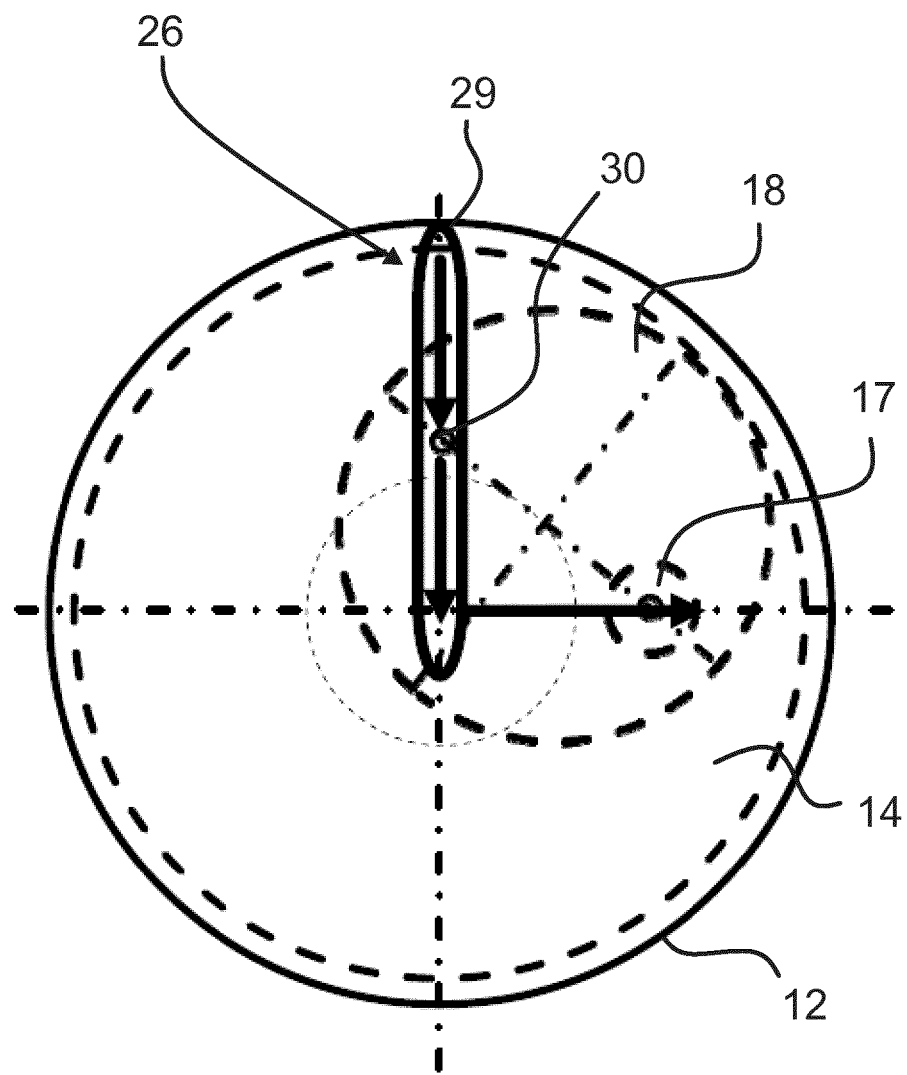
FIG. 12 shows a schematic view of an interlocking constraining means of the robot gripper.
Figure 13:
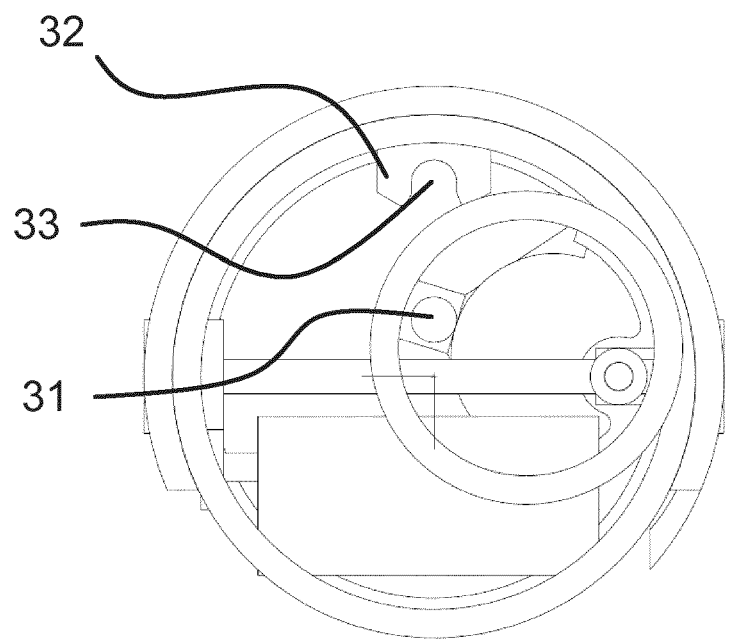
FIGS. 13-17 show a sequence of individual situations of spatial positions of a fork body and a journal of a specific interlocking constraining means of the robot gripper.
Figure 14:
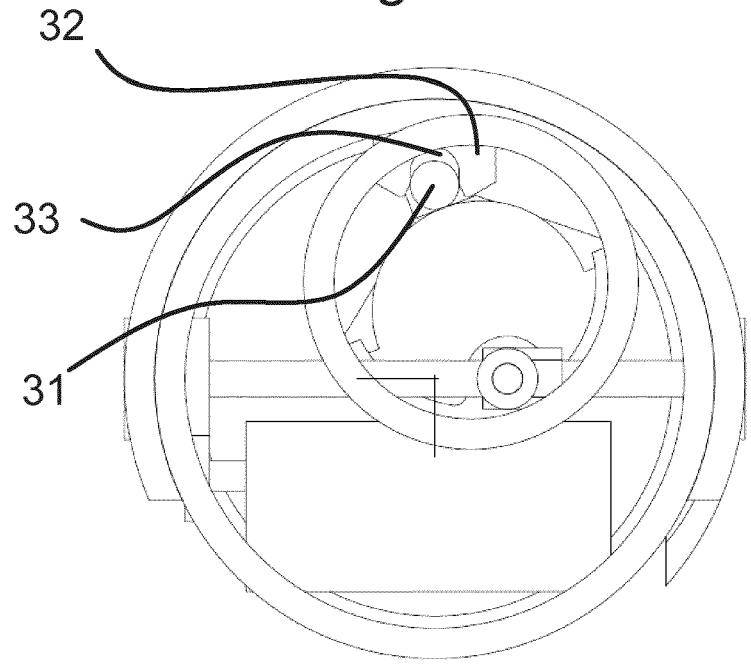
Figure 15:
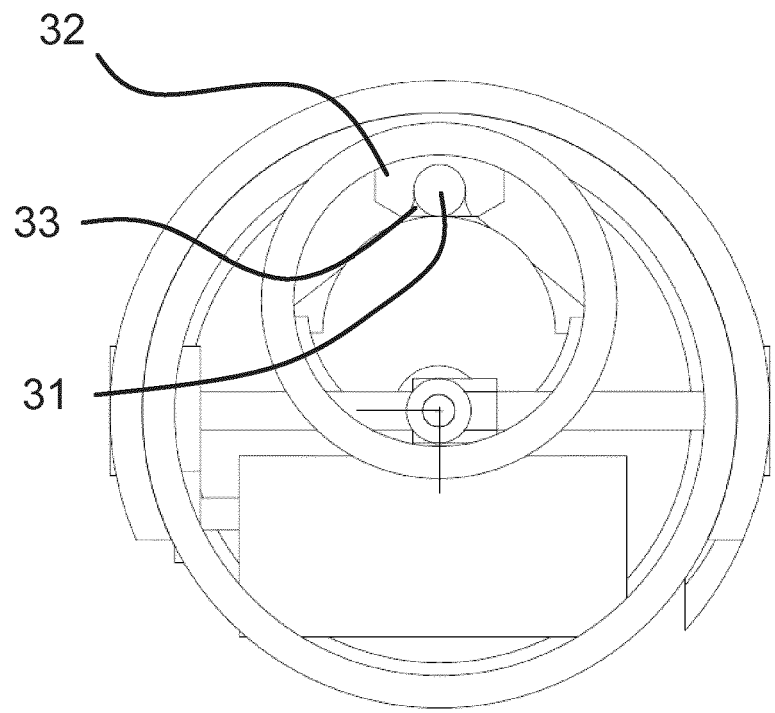
Figure 16:
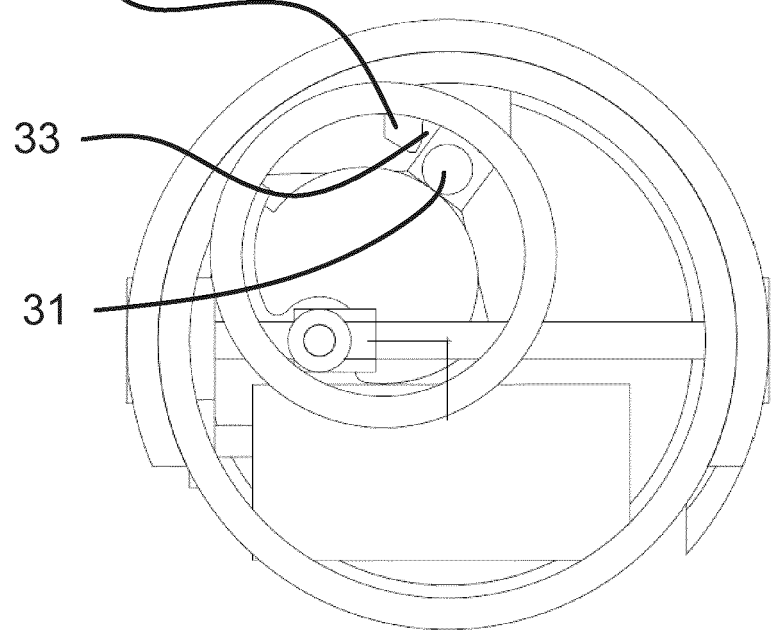
Figure 17:
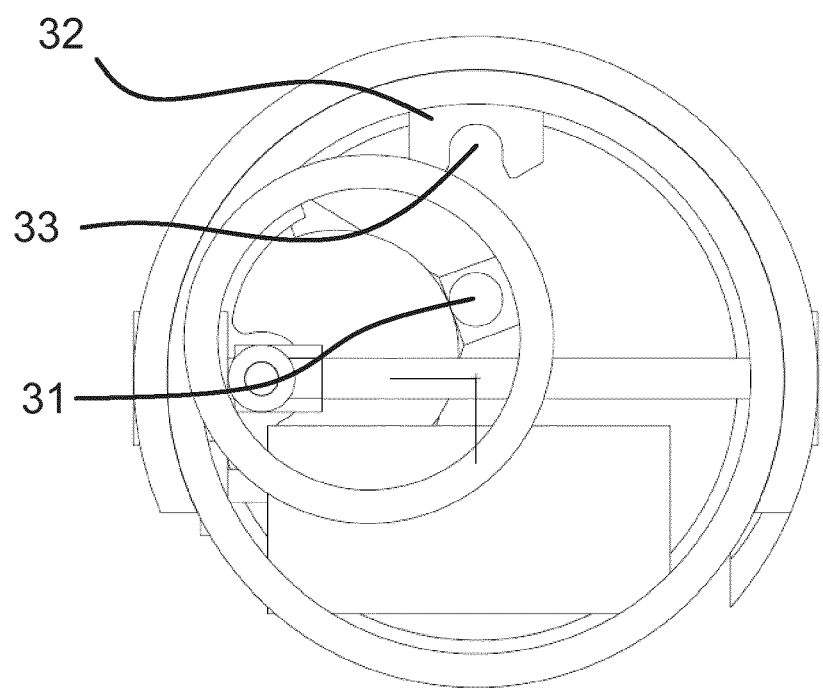

As shown schematically in FIG. 12, the constraining means 26 can comprise a pin 30 which is connected to the intermediate element 18, and a groove 29 which is connected to the gripper main body 12, wherein the pin 30 engages in the groove 27 such that, in case of an approach of the first rotational axis D1 to the third rotational axis D3, the pin 30 reaches and is stopped at the upper end of the groove 29, and so a further rotation of the intermediate element 18 is imposed.

As shown schematically in FIG. 13 to FIG. 17, the constraining means 26 can comprise a journal 31 which is connected to the intermediate element 18, and a fork body 32 which is connected to the gripper main body 12 and comprises a recess 33, wherein the fork body 32 and the journal 31 are designed and arranged such that, in case of an approach of the first rotational axis D1 to the third rotational axis D3, the journal 31 engages in the recess 33 of the fork body 32 in order to prevent a common rotation of the intermediate element 18 and the base element in the area of the singularity position by means of an interlocking coupling of the gripper main body 12 with the intermediate element 18. The journal 31 is formed by the intermediate element connecting strut 25 which connects the first annulus disk 24.1 and the second annulus disk 24.2.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot gripper, comprising:
    a gripper main body;
    a first gripper finger and at least one second gripper finger supported on the gripper main body;
    a base element mounted for rotation about a first rotational axis relative to the gripper main body by a first rotary joint;
    an intermediate element mounted for rotation relative to the base element by a second rotary joint;
    a finger carrier carrying the first gripper finger and mounted such that it can rotate relative to the intermediate element by a third rotary joint; and
    a drive device that is separate from the first rotary joint, the second rotary joint, and the third rotary joint, the drive device supported against the gripper main body and configured to adjust the finger carrier relative to the second gripper finger by application of a drive force introduced into the finger carrier by the drive device;
    wherein the intermediate element is mounted for rotation relative to the base element about a second rotational axis that is aligned parallel to the first rotational axis and is arranged at a constant first distance from the first rotational axis.

2. The robot gripper of claim 1, wherein the finger carrier is mounted such that it can rotate relative to the intermediate element about a third rotational axis that is aligned parallel to both the first rotational axis and the second rotational axis and is arranged at a constant second distance from the second rotational axis.

3. The robot gripper of claim 2, further comprising a device for circumventing singularities arising in which the first rotational axis aligns with the third rotational axis, the device comprising:
    constraining means configured to impede a movement of the base element about the first rotational axis by transferring a drive force introduced by the drive device in the area of the singularity at least partly into a rotation of the intermediate element about the second rotational axis.

4. The robot gripper of claim 3, wherein the constraining means comprises:
    a friction body connected to the gripper main body; and
    a counter friction body connected to the base element;
    wherein the friction body and the counter friction body are configured and arranged to frictionally contact one another as the first rotational axis approaches the third rotational axis, thereby impeding a further rotation of the base element.

5. The robot gripper of claim 3, wherein the constraining means comprises:
    a journal connected to the intermediate element; and
    a fork body connected to the gripper main body and defining a recess;
    wherein the fork body and the journal are configured and arranged such that the journal is received in the recess of the fork body as the first rotational axis approaches the third rotational axis, thereby impeding a further rotation of the intermediate element by interlocking coupling of the gripper main body with the intermediate element.

6. The robot gripper of 3, wherein the constraining means comprises:
    a journal connected to the intermediate element; and
    first and second cables;
    the first and second cables each having a first cable end respectively fastened to the journal, and each having a second cable end respectively fastened to the base element.

7. The robot gripper of claim 5, wherein:
    the second rotary joint comprises:
        a second lower bearing that surrounds the intermediate element and is arranged at a design height close to the finger carrier, and
        a second upper bearing that is spaced apart from the second lower bearing and is arranged at a design height distant from the finger carrier;
    the intermediate element comprises:
        a first annular disk that is rotatably mounted on the base element by the second lower bearing,
        a second annular disk that is rotatably mounted on the base element by the second upper bearing, and
        an intermediate element connecting strut rigidly connecting the first annular disk to the second annular disk; and
    the journal is formed by the intermediate element connecting strut which connects the first annular disk and the second annular disk.

8. The robot gripper of claim 6,
    the second rotary joint comprises:
        a second lower bearing that surrounds the intermediate element and is arranged at a design height close to the finger carrier, and
        a second upper bearing that is spaced apart from the second lower bearing and is arranged at a design height distant from the finger carrier;
    the intermediate element comprises:
        a first annular disk that is rotatably mounted on the base element by the second lower bearing,
        a second annular disk that is rotatably mounted on the base element by the second upper bearing, and
        an intermediate element connecting strut rigidly connecting the first annular disk to the second annular disk; and
    the journal is formed by the intermediate element connecting strut which connects the first annular disk and the second annular disk.

9. The robot gripper according to claim 1, wherein the at least one second gripper finger is configured to be stationary relative to the gripper main body.

10. The robot gripper of claim 1, wherein the drive device comprises:
    a motor;

a drive spindle mounted on the gripper main body for rotation about a spindle axis and rotatably driven by the motor; and an output spindle nut mounted on the drive spindle for linear adjustment along the spindle axis;

the output spindle nut coupled with the finger carrier such that the output spindle nut moves the finger carrier by actuation of the motor to rotate the drive spindle.

11. The robot gripper of claim 10, wherein the finger carrier is rigidly connected to the output spindle nut.

12. The robot gripper of claim 10, further comprising:

a linear guide configured to guidedly mount the finger carrier relative to the gripper main body by a bivalent first mounting system for the absorption of forces, such that the finger carrier is adjustable only in directions parallel to the spindle axis;

wherein the finger carrier is coupled to the output spindle nut for force transmission by a univalent second mounting system.

13. The robot gripper of claim 1, further comprising:

a univalent torque support configured for the absorption of torques, to mount the finger carrier relative to the gripper main body only by a single rotational degree of freedom about a longitudinal extension of the first gripper finger;

wherein the finger carrier is supported in two other rotational degrees of freedom by the first rotary joint, the second rotary joint, and the third rotary joint.

14. The robot gripper of claim 1, wherein:

the base element comprises a rotationally symmetrical outer casing wall on which the base element is rotatably mounted entirely within an outer contour of the gripper main body;

the intermediate element of the robot gripper comprises a rotationally symmetrical outer casing wall on which the intermediate element is rotatably mounted entirely within an outer contour of the base element; and the finger carrier of the robot gripper comprises a rotationally symmetrical outer casing wall on which the finger carrier is rotatably mounted entirely within an outer contour of the intermediate element;

wherein the first rotary joint comprises:
a first lower bearing that surrounds the base element and is arranged at a design height adjacent the finger carrier, and
a first upper bearing that is spaced apart from the first lower bearing and arranged at a design height distant from the finger carrier;

the second rotary joint comprises:
a second lower bearing that surrounds the intermediate element and is arranged at a design height adjacent the finger carrier, and
a second upper bearing that is spaced apart from the second lower bearing and is arranged at a design height distant from the finger carrier; and the third rotary joint comprises:
a third lower bearing that surrounds the finger carrier and is arranged at a design height adjacent the finger carrier, and
a third upper bearing that is spaced apart from the third lower bearing and is arranged at a design height distant from the finger carrier.

15. The robot gripper of claim 14, wherein the intermediate element comprises:

a first annular disk that is rotatably mounted on the base element by the second lower bearing;

a second annular disk that is rotatably mounted on the base element by the second upper bearing; and an intermediate element connecting strut rigidly connecting the first annular disk to the second annular disk.

16. The robot gripper of claim 14, wherein the base element comprises:

a third annular disk that is rotatably mounted on the gripper main body by the first lower bearing;

a fourth annular disk that is rotatably mounted on the gripper main body by the first upper bearing; and a base element connecting strut rigidly connecting the third annular disk to the fourth annular disk.

17. The robot gripper of claim 1, wherein the drive device is configured to be self-locking.

* * * * *